US012720469B2

(12) United States Patent
Vassilovski et al.

(10) Patent No.: US 12,720,469 B2
(45) Date of Patent: Aug. 25, 2026

(54) SIDELINK POSITIONING GROUP MODIFICATION

(71) Applicant: QUALCOMM Incorporated, San Diego, CA (US)

(72) Inventors: Dan Vassilovski, Del Mar, CA (US); Hong Cheng, Basking Ridge, NJ (US); Sven Fischer, Nuremberg (DE); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 356 days.

(21) Appl. No.: 18/522,702

(22) Filed: Nov. 29, 2023

(65) Prior Publication Data

US 2025/0039824 A1 Jan. 30, 2025

Related U.S. Application Data

(60) Provisional application No. 63/516,297, filed on Jul. 28, 2023.

(51) Int. Cl.
*H04W 64/00* (2009.01)
*H04W 76/14* (2018.01)

(52) U.S. Cl.
CPC ........... *H04W 64/00* (2013.01); *H04W 76/14* (2018.02)

(58) Field of Classification Search
CPC ...... H04M 64/00; H04W 76/14; H04W 64/00
See application file for complete search history.

(56) References Cited

U.S. PATENT DOCUMENTS 11,916,825 B2 * 2/2024 Wu ........................ H04W 72/21
2023/0125160 A1 * 4/2023 Sirotkin ................ H04W 64/00 455/456.1

(Continued)

FOREIGN PATENT DOCUMENTS

WO WO-2022216345 A1 * 10/2022 ........... G01S 5/0244
WO WO-2022220934 A1 * 10/2022 ........... G01S 5/0072

(Continued)

OTHER PUBLICATIONS

International Search Report and Written Opinion—PCT/US2024/032403—ISA/EPO—Sep. 24, 2024.

(Continued)

*Primary Examiner* — William G Trost, IV
(74) *Attorney, Agent, or Firm* — Muncy, Geissler, Olds & Lowe, P.C.

(57) ABSTRACT

Disclosed are techniques for wireless communication. In an aspect, a user equipment (UE) transmits, to a plurality of UEs, a request capabilities message for a sidelink positioning session among the plurality of UEs, wherein the request capabilities message includes a first group identifier for the UE and the plurality of UEs, receives a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session, and transmits, to the plurality of UEs, based at least in part on the one or more capabilities of each of the plurality of UEs, a message indicating that one or more UEs of the plurality of UEs are not to participate in the sidelink positioning session.

28 Claims, 17 Drawing Sheets

(56) References Cited

U.S. PATENT DOCUMENTS

| | | | | |
|---|---|---|---|---|
| 2024/0284528 | A1 | 8/2024 | Fischer | |
| 2024/0422721 | A1* | 12/2024 | Yue | G01S 13/765 |
| 2025/0106815 | A1* | 3/2025 | Hu | H04W 64/006 |

FOREIGN PATENT DOCUMENTS

| | | | | | |
|---|---|---|---|---|---|
| WO | WO-2023134941 | A1 * | 7/2023 | H04W 72/40 |
| WO | WO-2024173743 | | 8/2024 | |

OTHER PUBLICATIONS

LG Electronics: "Discussion on Sidelink Positioning", 3GPP TSG-RAN WG2 Meeting #121bis-e, R2-2303131, Type Discussion, 3rd Generation Partnership Project, Mobile Competence Centre, 650, Route Des Lucioles, F-06921 Sophia-antipolis Cedex, France vol. 3GPP RAN 2, No. Online, Apr. 17, 2023-Apr. 26, 2023, Apr. 7, 2023, 34 Pages XP052289533, p. 19, Line 1-Line 21 Figure 7.

Qualcomm Incorporated: "Sidelink Positioning Protocol (SLPP) Signaling and Procedures", 3GPP TSG RAN WG2 Meeting #121bis-e, R2-2303591, 3GPP, Mobile Competence Centre, 650, Route Des Lucioles, F-06921 Sophia-antipolis Cedex, France vol. RAN WG2, No. Online, Apr. 17, 2023-Apr. 26, 2023, Apr. 7, 2023, XP052365852, 51 Pages, Paragraph [04.2], p. 12-p. 13, Paragraph 1 Figures 6,9.

Qualcomm Incorporated: "Sidelink Positioning Protocol (SLPP) Signaling and Procedures", 3GPP TSG RAN WG2 Meeting #122, R2-2306422, Type Discussion, 3GPP, Mobile Competence Centre, 650, Route Des Lucioles, F-06921 Sophia-Antipolis Cedex, France, vol. 3GPP RAN 2, No. Incheon, KR, May 22, 2023-May 26, 2023, May 12, 2023, XP052315634, p. 7, Last Paragraph—p. 8 p. 12, Line 1—p. 13, Line 6 Figures 5,8, 56 Pages.

Qualcomm Incorporated: "Support of Multiple Target UEs for Sidelink Positioning (Draft Response LS to R2-2302448 (S2-2303837))", 3GPP TSG RAN WG2 Meeting #122, R2-2306387, Type Discussion, 3rd Generation Partnership Project, Mobile Competence Centre, 650, Route Des Lucioles, F-06921 Sophia-antipolis Cedex, France, vol. 3GPP RAN 2, No. Incheon, KR, May 22, 2023-May 26, 2023, May 12, 2023, 19 Pages, XP052315600, p. 10, Line 1-Line 18 Figure 3.

* cited by examiner

```
sl-SLPPMemberList ::= SEQUENCE (SIZE (1..maxSLPPMgdGroupSize)) OF sl-SLPPMemberID,
   sl-SLPPMemberID   ::= INTEGER {0..16777215},

maxSLPPMgdGroupSize INTEGER ::= 65535  -- Max number of SLPP managed groupcast UEs
```

| |
|---|
| ***sl-SLPPMemberList***<br>List of UE member IDs that are part of a managed groupcast group of UEs that have compatible sidelink positioning capabilities. |
| ***sl-SLPPMemberID***<br>Specifies the individual member ID within the list of UE member IDs that are part of a managed groupcast group of UEs that have compatible sidelink positioning capabilities. |
| ***maxSLPPMgdGroupSize***<br>Specifies the maximum number of UEs that are part of a managed groupcast group of UEs that have compatible sidelink positioning capabilities. |

FIG. 8

```
sl-SLPPGroupInformation ::= SEQUENCE {
   sl-SLPPMemberList ::= SEQUENCE (SIZE (1..maxSLPPMgdGroupSize)) OF sl-SLPPMemberID,
      sl-SLPPMemberID   ::= INTEGER {0..16777215},
   maxSLPPMgdGroupSize INTEGER ::= 65535  -- Max number of SLPP managed groupcast UEs
   sl-SLPPGroupIdentifier INTEGER ::= 65535  -- Max number of SLPP managed groupcast Ues
}
```

| ***sl-SLPPGroupInformation* field descriptions** |
|---|
| ***sl-SLPPMemberList***<br>List of UE member IDs that are part of a managed groupcast group of UEs that have compatible sidelink positioning capabilities. |
| ***sl-SLPPMemberID***<br>Specifies the individual member ID within the list of UE member IDs that are part of a managed groupcast group of UEs that have compatible sidelink positioning capabilities. |
| ***maxSLPPMgdGroupSize***<br>Specifies the maximum number of UEs that are part of a managed groupcast group of UEs that have compatible sidelink positioning capabilities. |
| ***sl-SLPPGroupIdentifier***<br>Specifies the managed groupcast identifier for the set of UEs that are part of a managed groupcast group Of UEs that have compatible sidelink positioning capabilities. |

*FIG. 11*

SIDELINK POSITIONING GROUP MODIFICATION

CROSS-REFERENCE TO RELATED APPLICATIONS

The present Application for Patent claims the benefit of U.S. Provisional Application No. 63/516,297, entitled "SIDELINK POSITIONING GROUP MODIFICATION," filed Jul. 28, 2023, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), enables higher data transfer speeds, greater numbers of connections, and better coverage, among other improvements. The 5G standard, according to the Next Generation Mobile Networks Alliance, is designed to provide higher data rates as compared to previous standards, more accurate positioning (e.g., based on reference signals for positioning (RS-P), such as downlink, uplink, or sidelink positioning reference signals (PRS)) and other technical enhancements.

Leveraging the increased data rates and decreased latency of 5G, among other things, vehicle-to-everything (V2X) communication technologies are being implemented to support autonomous driving applications, such as wireless communications between vehicles, between vehicles and the roadside infrastructure, between vehicles and pedestrians, etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes transmitting, to a plurality of UEs, a request capabilities message for a sidelink positioning session among the plurality of UEs, wherein the request capabilities message includes a first group identifier for the UE and the plurality of UEs; receiving a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session; and transmitting, to the plurality of UEs, based at least in part on the one or more capabilities of each of the plurality of UEs, a message indicating that one or more UEs of the plurality of UEs are not to participate in the sidelink positioning session.

In an aspect, a method of wireless communication performed by a first user equipment (UE) includes receiving, from a second UE, a request capabilities message for a sidelink positioning session among a plurality of UEs, including the first UE and the second UE, wherein the request capabilities message includes a first group identifier for the plurality of UEs; transmitting, to the second UE, a sidelink positioning capabilities message including the first group identifier and one or more capabilities of the first UE to participate in the sidelink positioning session; and receiving, from the second UE, a message indicating that one or more UEs of the plurality of UEs are not to participate in the sidelink positioning session.

In an aspect, a user equipment (UE) includes one or more memories; one or more transceivers; and one or more processors communicatively coupled to the one or more memories and the one or more transceivers, the one or more processors, either alone or in combination, configured to: transmit, via the one or more transceivers, to a plurality of UEs, a request capabilities message for a sidelink positioning session among the plurality of UEs, wherein the request capabilities message includes a first group identifier for the UE and the plurality of UEs; receive, via the one or more transceivers, a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session; and transmit, via the one or more transceivers, to the plurality of UEs, based at least in part on the one or more capabilities of each of the plurality of UEs, a message indicating that one or more UEs of the plurality of UEs are not to participate in the sidelink positioning session.

In an aspect, a first user equipment (UE) includes one or more memories; one or more transceivers; and one or more processors communicatively coupled to the one or more memories and the one or more transceivers, the one or more processors, either alone or in combination, configured to: receive, via the one or more transceivers, from a second UE, a request capabilities message for a sidelink positioning session among a plurality of UEs, including the first UE and the second UE, wherein the request capabilities message includes a first group identifier for the plurality of UEs; transmit, via the one or more transceivers, to the second UE, a sidelink positioning capabilities message including the first group identifier and one or more capabilities of the first UE to participate in the sidelink positioning session; and receive, via the one or more transceivers, from the second UE, a message indicating that one or more UEs of the plurality of UEs are not to participate in the sidelink positioning session.

In an aspect, a user equipment (UE) includes means for transmitting, to a plurality of UEs, a request capabilities message for a sidelink positioning session among the plurality of UEs, wherein the request capabilities message includes a first group identifier for the UE and the plurality of UEs; means for receiving a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session; and means for transmitting, to the plurality of UEs, based at least in part on the one or more capabilities of each of the plurality of UEs, a message indicating that one or more UEs of the plurality of UEs are not to participate in the sidelink positioning session.

In an aspect, a first user equipment (UE) includes means for receiving, from a second UE, a request capabilities message for a sidelink positioning session among a plurality of UEs, including the first UE and the second UE, wherein the request capabilities message includes a first group identifier for the plurality of UEs; means for transmitting, to the second UE, a sidelink positioning capabilities message including the first group identifier and one or more capabilities of the first UE to participate in the sidelink positioning session; and means for receiving, from the second UE, a message indicating that one or more UEs of the plurality of UEs are not to participate in the sidelink positioning session.

In an aspect, a non-transitory computer-readable medium stores computer-executable instructions that, when executed by a user equipment (UE), cause the UE to: transmit, to a plurality of UEs, a request capabilities message for a sidelink positioning session among the plurality of UEs, wherein the request capabilities message includes a first group identifier for the UE and the plurality of UEs; receive a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session; and transmit, to the plurality of UEs, based at least in part on the one or more capabilities of each of the plurality of UEs, a message indicating that one or more UEs of the plurality of UEs are not to participate in the sidelink positioning session.

In an aspect, a non-transitory computer-readable medium stores computer-executable instructions that, when executed by a first user equipment (UE), cause the first UE to: receive, from a second UE, a request capabilities message for a sidelink positioning session among a plurality of UEs, including the first UE and the second UE, wherein the request capabilities message includes a first group identifier for the plurality of UEs; transmit, to the second UE, a sidelink positioning capabilities message including the first group identifier and one or more capabilities of the first UE to participate in the sidelink positioning session; and receive, from the second UE, a message indicating that one or more UEs of the plurality of UEs are not to participate in the sidelink positioning session.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 8 illustrates an example SLPP Provide Assistance Data information element (IE), according to aspects of the disclosure.

FIG. 11 illustrates an example SLPP positioning group information element (IE), according to aspects of the disclosure.

DETAILED DESCRIPTION

Figure 1:
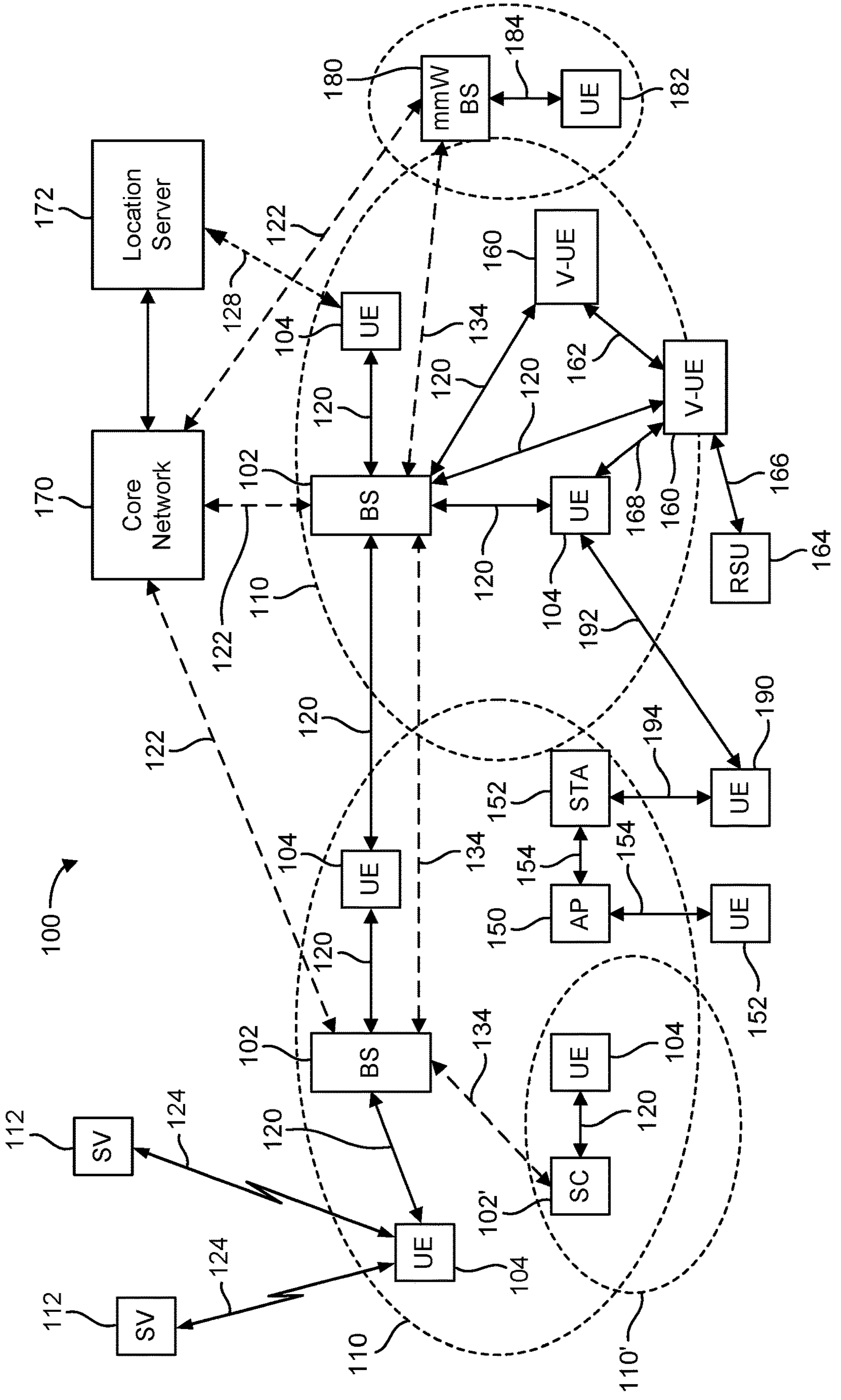
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

Various aspects relate generally to sidelink positioning. Sidelink-based ranging and positioning (SLRP) enables determinations of UE relative distance and absolute position for multiple user equipments (UEs) simultaneously over any cast type to provide range and position measurements in the absence of global navigation satellite system (GNSS) positioning. In some examples, techniques are provided to modify a sidelink positioning session groupcast group to reduce participant UE processing and over-the-air resource utilization. In some examples, a method is disclosed to inform the members of the sidelink positioning protocol (SLPP) managed groupcast session of the subset of UEs having compatible sidelink positioning capabilities and directing those UEs with incompatible capabilities not to transmit sidelink positioning reference signals (SL-PRS) or SLPP messages to the group.

Particular aspects of the subject matter described in this disclosure can be implemented to realize one or more of the following potential advantages. In some examples, by directing those UEs with incompatible capabilities not to transmit SL-PRS or SLPP messages to the group, the described techniques can be used to reduce transmissions and exclude extraneous and/or incorrect data.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE), "vehicle UE" (V-UE), "pedestrian UE" (P-UE), and "base station" are not intended to be specific or otherwise limited to any particular radio access technology (RAT), unless otherwise noted. In general, a UE may be any wireless communication device (e.g., vehicle on-board computer, vehicle navigation device, mobile phone, router, tablet computer, laptop computer, asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as a "mobile device," an "access terminal" or "AT," a "client device," a "wireless device," a "subscriber device," a "subscriber terminal," a "subscriber station," a "user terminal" or UT, a "mobile terminal," a "mobile station," or variations thereof.

A V-UE is a type of UE and may be any in-vehicle wireless communication device, such as a navigation system, a warning system, a heads-up display (HUD), an on-board computer, an in-vehicle infotainment system, an automated driving system (ADS), an advanced driver assistance system (ADAS), etc. Alternatively, a V-UE may be a portable wireless communication device (e.g., a cell phone, tablet computer, etc.) that is carried by the driver of the vehicle or a passenger in the vehicle. The term "V-UE" may refer to the in-vehicle wireless communication device or the vehicle itself, depending on the context. A P-UE is a type of UE and may be a portable wireless communication device that is carried by a pedestrian (i.e., a user that is not driving or riding in a vehicle). Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on Institute of Electrical and Electronics Engineers (IEEE) 802.11, etc.) and so on.

A base station may operate according to one of several RATs in communication with UEs depending on the network in which it is deployed, and may be alternatively referred to as an access point (AP), a network node, a NodeB, an evolved NodeB (CNB), a next generation eNB (ng-eNB), a New Radio (NR) Node B (also referred to as a gNB or gNodeB), etc. A base station may be used primarily to support wireless access by UEs including supporting data, voice and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference RF signals to UEs to be measured by the UEs and/or may receive and measure signals transmitted by the UEs. Such base stations may be referred to as positioning beacons (e.g., when transmitting RF signals to UEs) and/or as location measurement units (e.g., when receiving and measuring RF signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labelled "BS") and various UEs 104. The base stations 102 may include macro cell base stations (high power cellular base stations) and/or small cell base stations (low power cellular base stations). In an aspect, the macro cell base stations 102 may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labelled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MULTEFIRE®.

The wireless communications system 100 may further include a mmW base station 180 that may operate in millimeter wave (mmW) frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the INTERNATIONAL TELECOMMUNICATION UNION® as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

Leveraging the increased data rates and decreased latency of NR, among other things, vehicle-to-everything (V2X) communication technologies are being implemented to support intelligent transportation systems (ITS) applications, such as wireless communications between vehicles (vehicle-to-vehicle (V2V)), between vehicles and the roadside infrastructure (vehicle-to-infrastructure (V2I)), and between vehicles and pedestrians (vehicle-to-pedestrian (V2P)). The goal is for vehicles to be able to sense the environment around them and communicate that information to other vehicles, infrastructure, and personal mobile devices. Such vehicle communication will enable safety, mobility, and environmental advancements that current technologies are unable to provide. Once fully implemented, the technology is expected to reduce unimpaired vehicle crashes by 80%.

Still referring to FIG. 1, the wireless communications system 100 may include multiple V-UEs 160 that may communicate with base stations 102 over communication links 120 using the Uu interface (i.e., the air interface between a UE and a base station). V-UEs 160 may also communicate directly with each other over a wireless sidelink 162, with a roadside unit (RSU) 164 (a roadside access point) over a wireless sidelink 166, or with sidelink-capable UEs 104 over a wireless sidelink 168 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, V2V communication, V2X communication (e.g., cellular V2X (cV2X) communication, enhanced V2X (eV2X) communication, etc.), emergency rescue applications, etc. One or more of a group of V-UEs 160 utilizing sidelink communications may be within the geographic coverage area 110 of a base station 102. Other V-UEs 160 in such a group may be outside the geographic coverage area 110 of a base station 102 or be otherwise unable to receive transmissions from a base station 102. In some cases, groups of V-UEs 160 communicating via sidelink communications may utilize a one-to-many (1:M) system in which each V-UE 160 transmits to every other V-UE 160 in the group. In some cases, a base station 102 facilitates the scheduling of resources for sidelink communications. In other cases, sidelink communications are carried out between V-UEs 160 without the involvement of a base station 102.

In an aspect, the sidelinks 162, 166, 168 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs.

In an aspect, the sidelinks 162, 166, 168 may be cV2X links. A first generation of cV2X has been standardized in LTE, and the next generation is expected to be defined in NR. cV2X is a cellular technology that also enables device-to-device communications. In the U.S. and Europe, cV2X is expected to operate in the licensed ITS band in sub-6 GHz. Other bands may be allocated in other countries. Thus, as a particular example, the medium of interest utilized by sidelinks 162, 166, 168 may correspond to at least a portion of the licensed ITS frequency band of sub-6 GHz. However, the present disclosure is not limited to this frequency band or cellular technology.

In an aspect, the sidelinks 162, 166, 168 may be dedicated short-range communications (DSRC) links. DSRC is a one-way or two-way short-range to medium-range wireless communication protocol that uses the wireless access for vehicular environments (WAVE) protocol, also known as IEEE 802.11p, for V2V, V2I, and V2P communications. IEEE 802.11p is an approved amendment to the IEEE 802.11 standard and operates in the licensed ITS band of 5.9 GHz (5.85-5.925 GHz) in the U.S. In Europe, IEEE 802.11p operates in the ITS G5A band (5.875-5.905 MHz). Other bands may be allocated in other countries. The V2V communications briefly described above occur on the Safety Channel, which in the U.S. is typically a 10 MHz channel that is dedicated to the purpose of safety. The remainder of the DSRC band (the total bandwidth is 75 MHz) is intended for other services of interest to drivers, such as road rules, tolling, parking automation, etc. Thus, as a particular example, the mediums of interest utilized by sidelinks 162, 166, 168 may correspond to at least a portion of the licensed ITS frequency band of 5.9 GHz.

Alternatively, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Communications between the V-UEs 160 are referred to as V2V communications, communications between the V-UEs 160 and the one or more RSUs 164 are referred to as V2I communications, and communications between the V-UEs 160 and one or more UEs 104 (where the UEs 104 are P-UEs) are referred to as V2P communications. The V2V communications between V-UEs 160 may include, for example, information about the position, speed, acceleration, heading, and other vehicle data of the V-UEs 160. The V2I information received at a V-UE 160 from the one or more RSUs 164 may include, for example, road rules, parking automation information, etc. The V2P communications between a V-UE 160 and a UE 104 may include information about, for example, the position, speed, acceleration, and heading of the V-UE 160 and the position, speed (e.g., where the UE 104 is carried by a user on a bicycle), and heading of the UE 104.

Note that although FIG. 1 only illustrates two of the UEs as V-UEs (V-UEs 160), any of the illustrated UEs (e.g., UEs 104, 152, 182, 190) may be V-UEs. In addition, while only the V-UEs 160 and a single UE 104 have been illustrated as being connected over a sidelink, any of the UEs illustrated in FIG. 1, whether V-UEs, P-UEs, etc., may be capable of sidelink communication. Further, although only UE 182 was described as being capable of beam forming, any of the illustrated UEs, including V-UEs 160, may be capable of beam forming. Where V-UEs 160 are capable of beam forming, they may beam form towards each other (i.e., towards other V-UEs 160), towards RSUs 164, towards other UEs (e.g., UEs 104, 152, 182, 190), etc. Thus, in some cases, V-UEs 160 may utilize beamforming over sidelinks 162, 166, and 168.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WI-FI DIRECT®, BLUETOOTH®, and so on. As another example, the D2D P2P links 192 and 194 may be sidelinks, as described above with reference to sidelinks 162, 166, and 168.

Figure 2A:
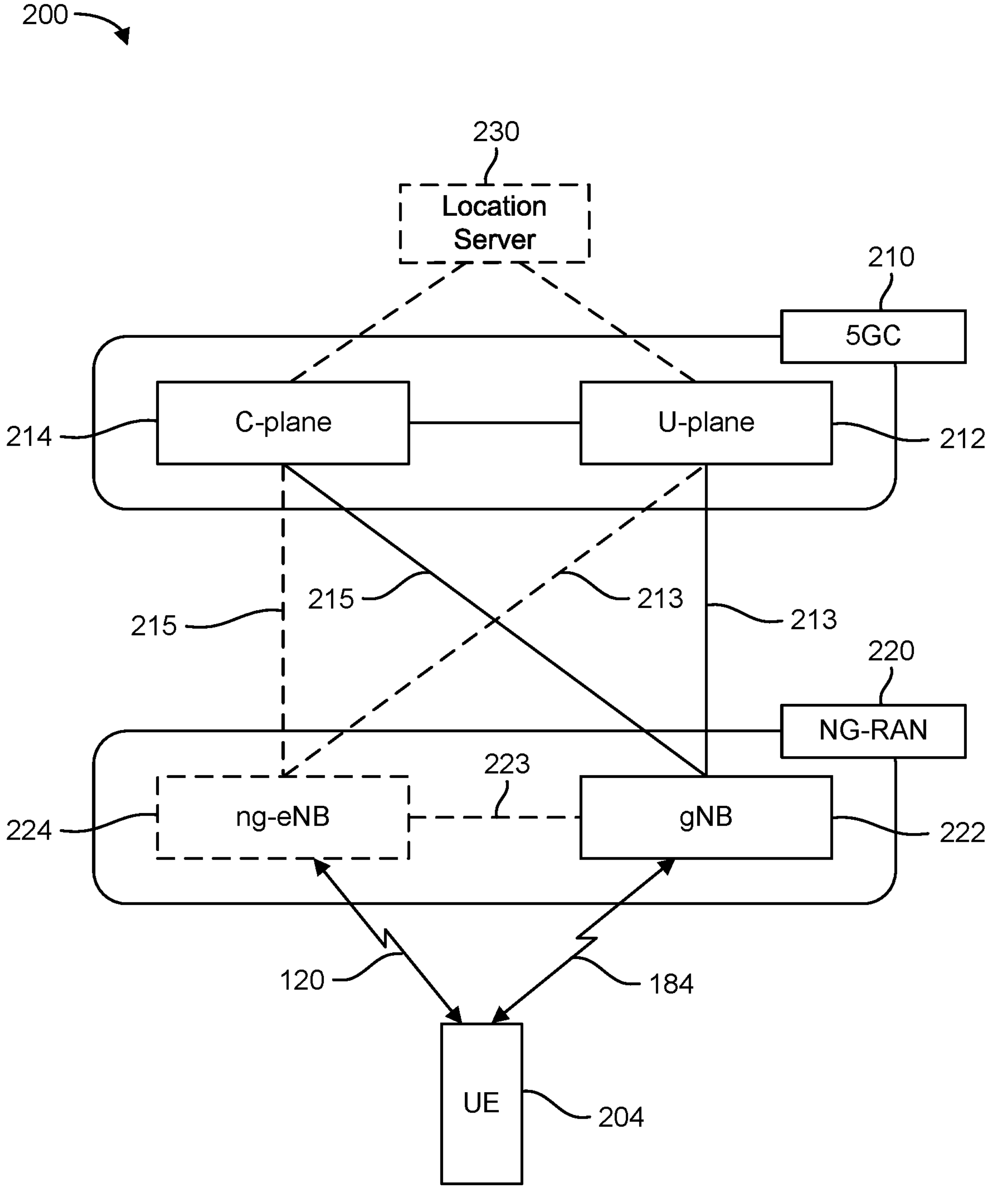
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
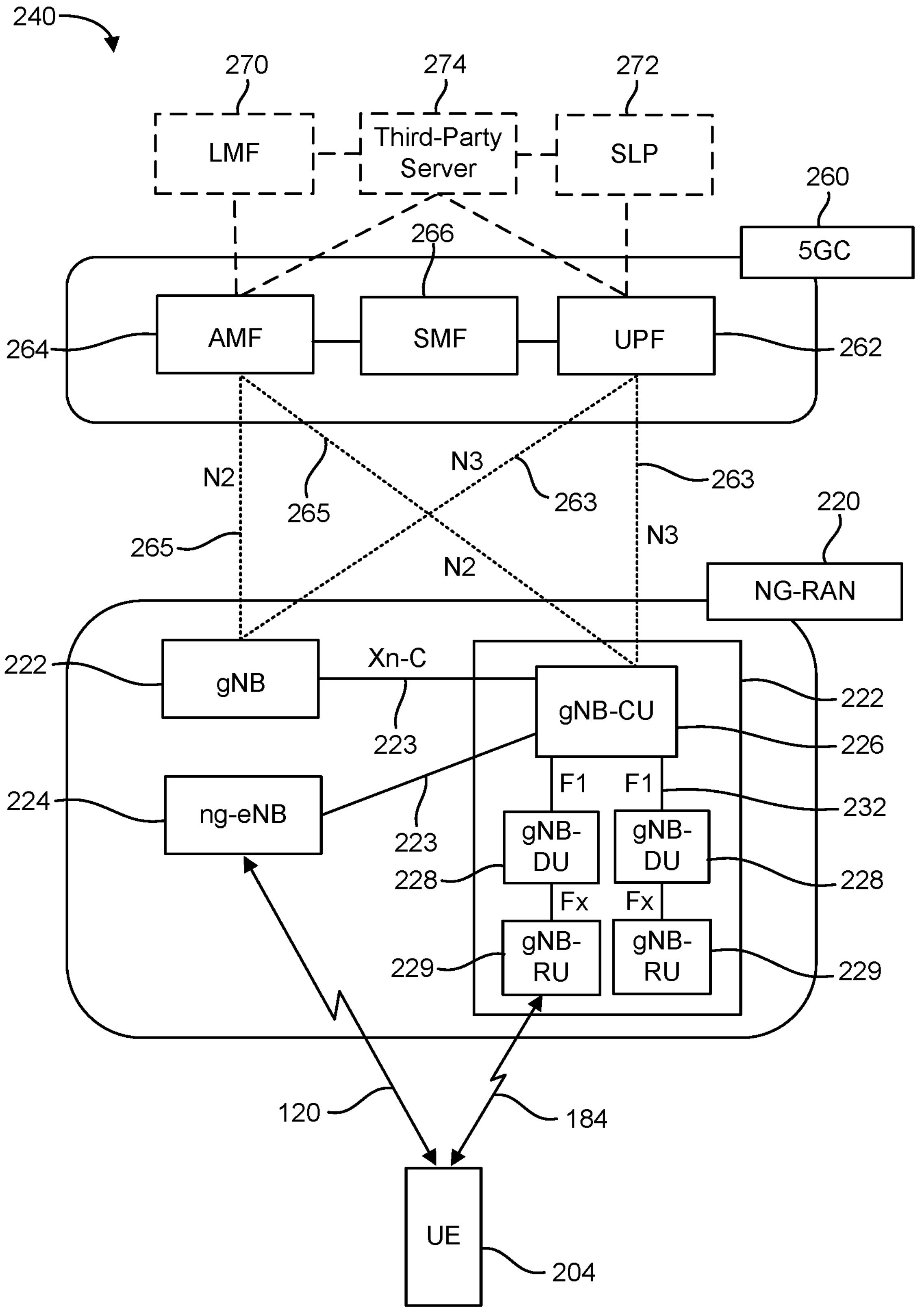

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP® (Third Generation Partnership Project) access networks.

Functions of the UPF 262 include acting as an anchor point for intra/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Figure 3A:
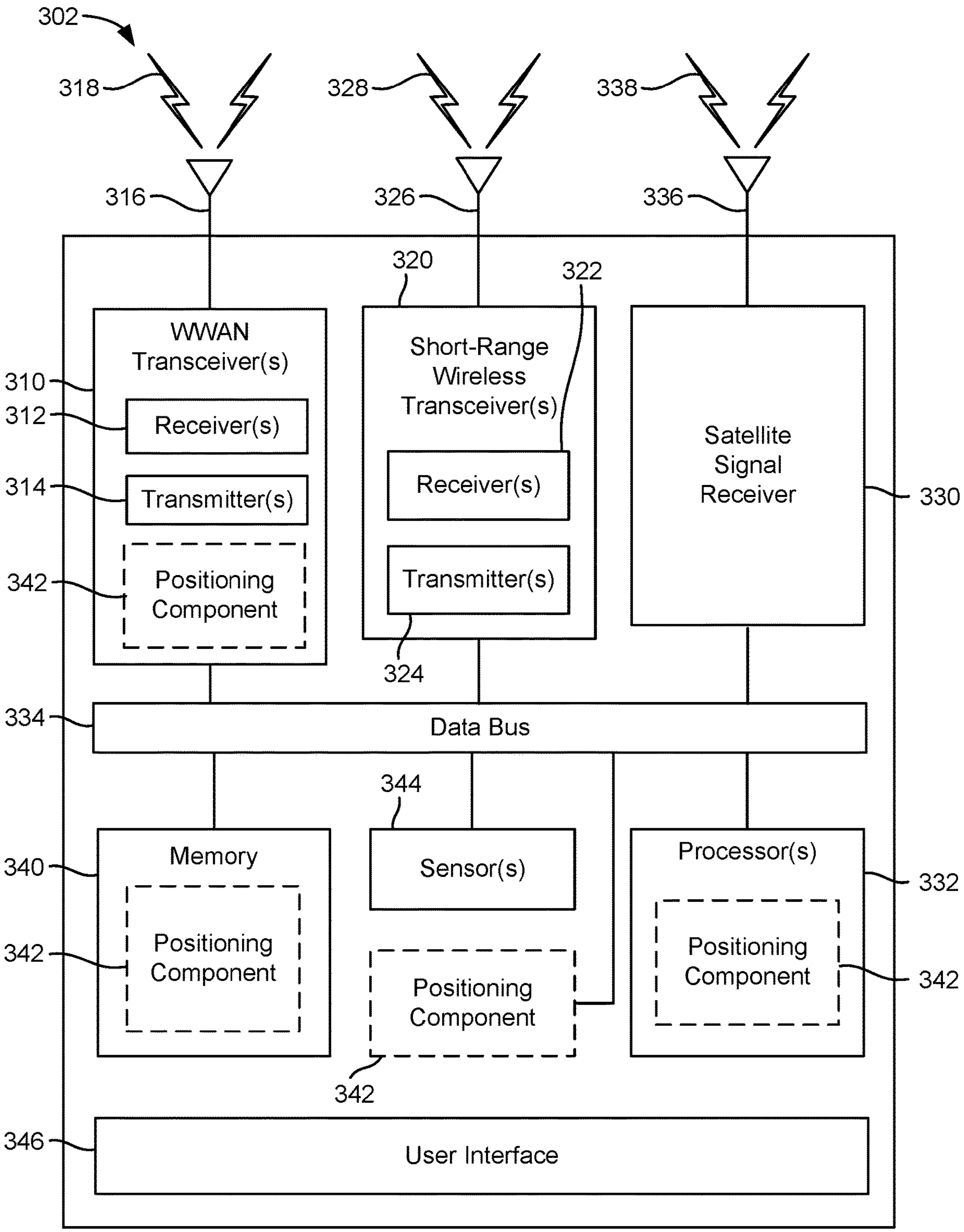
FIGS. 3A, 3B, and 3C are simplified block diagrams of several sample aspects of components that may be employed in a user equipment (UE), a base station, and a network entity, respectively, and configured to support communications as taught herein.
Figure 3B:
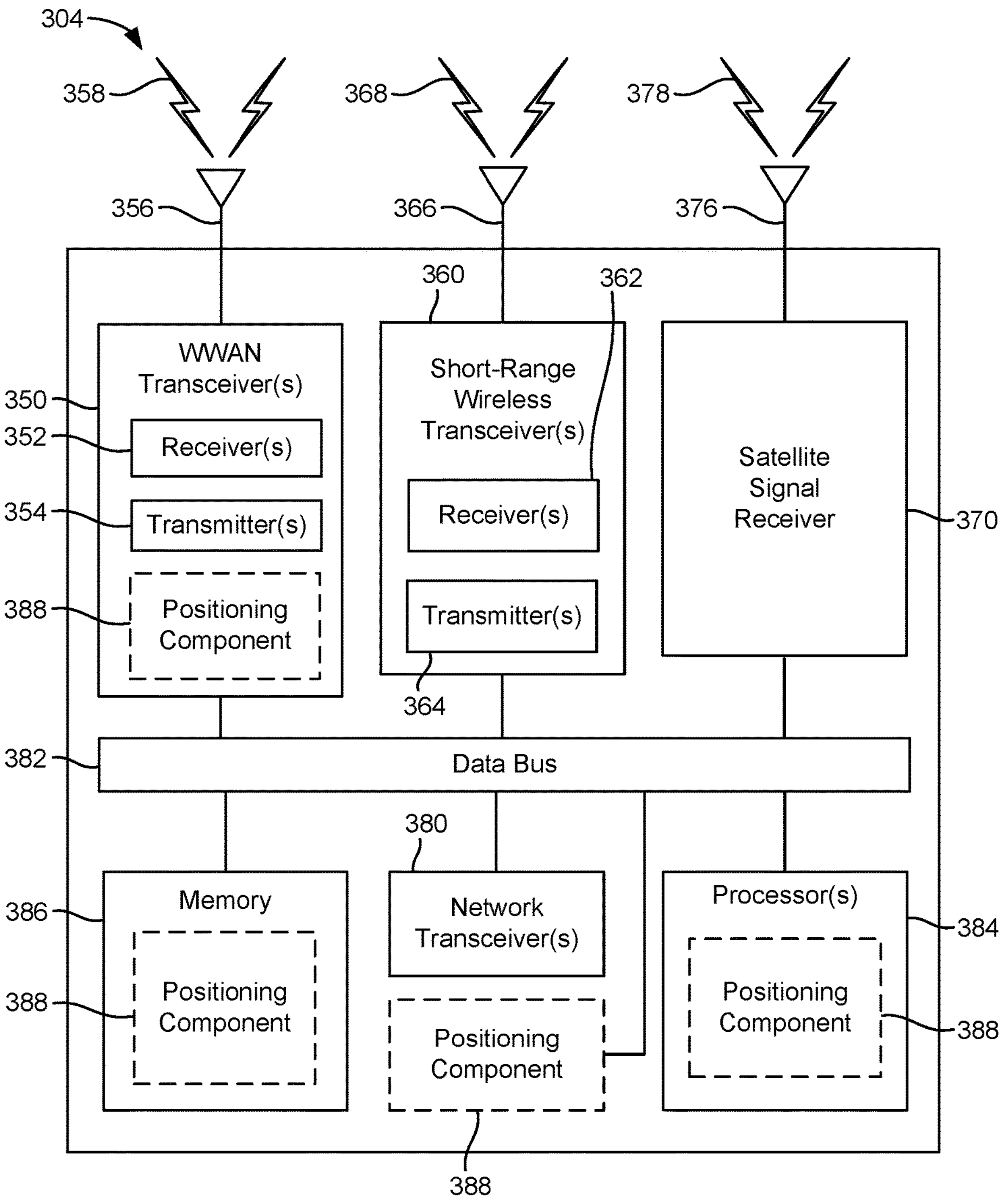
Figure 3C:
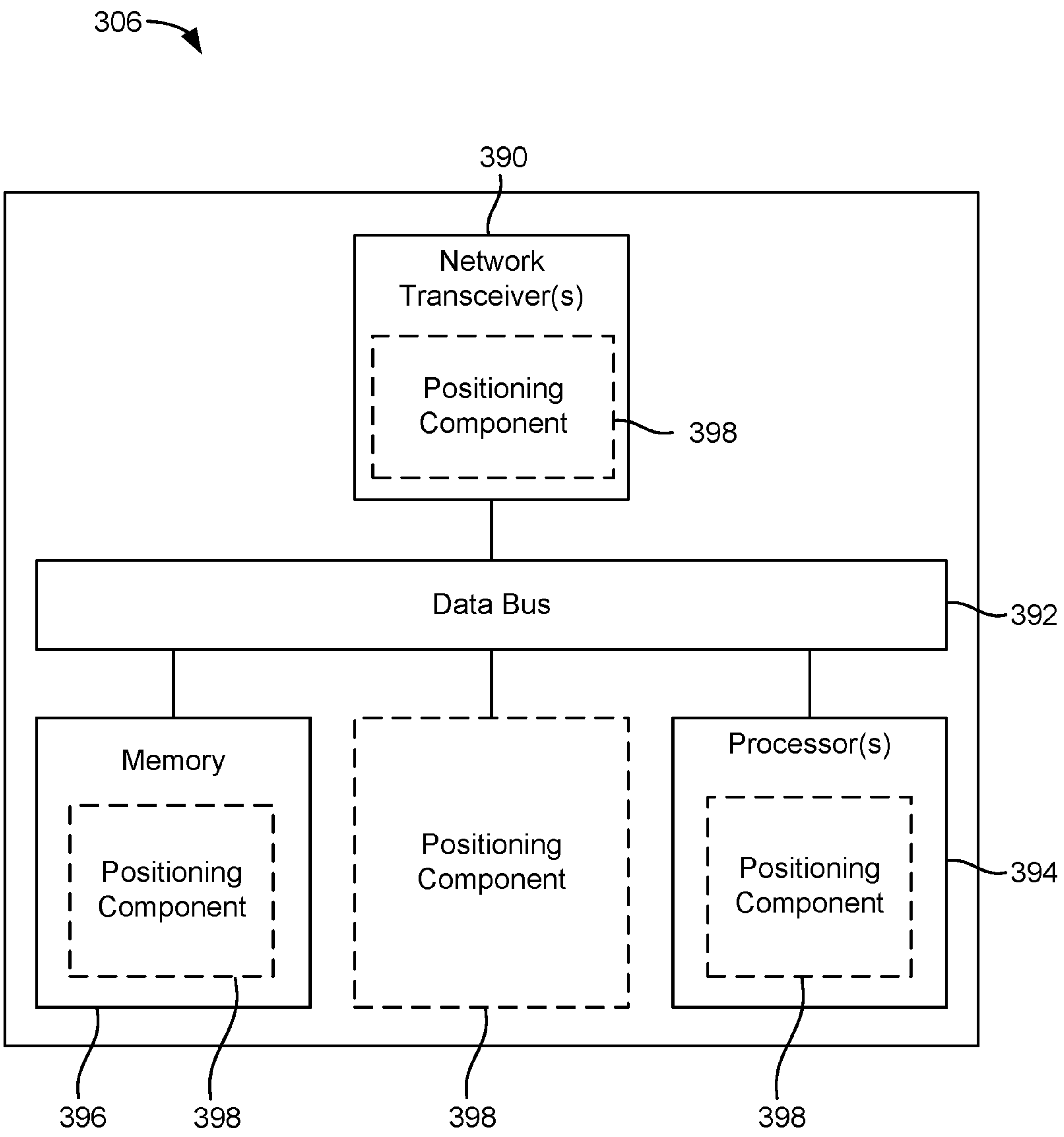

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., Wi-Fi, LTE Direct, BLUETOOTH®, ZIGBEE®, Z-WAVE®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be Wi-Fi transceivers, BLUETOOTH® transceivers, ZIGBEE® and/or Z-WAVE® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively.

Where the satellite signal receivers 330 and 370 are satellite positioning system receivers, the satellite positioning/communication signals 338 and 378 may be global positioning system (GPS) signals, global navigation satellite system (GLONASS®) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or personal computer (PC) or laptop may have Wi-Fi and/or BLUETOOTH® capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi “hotspot” access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICS (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed “by a UE,” “by a base station,” “by a network entity,” etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as Wi-Fi).

Figure 4A:
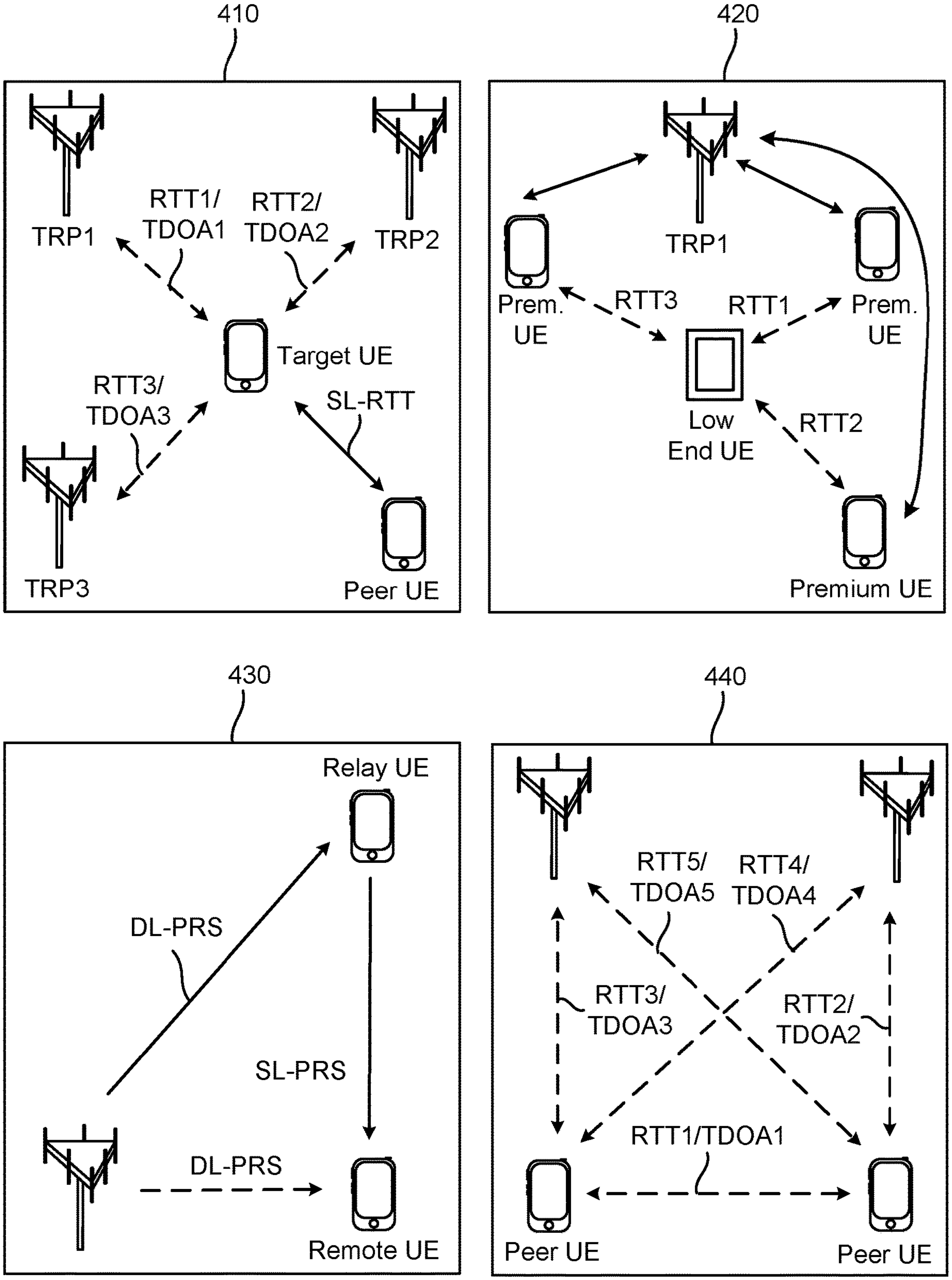
FIGS. 4A and 4B illustrate various scenarios of interest for sidelink-only or joint Uu and sidelink positioning, according to aspects of the disclosure.

NR supports, or enables, various sidelink positioning techniques. FIG. 4A illustrates various scenarios of interest for sidelink-only or joint Uu and sidelink positioning, according to aspects of the disclosure. In scenario 410, at least one peer UE with a known location can improve the Uu-based positioning (e.g., multi-cell round-trip-time (RTT), downlink time difference of arrival (DL-TDOA), etc.) of a target UE by providing an additional anchor (e.g., using sidelink RTT (SL-RTT)). In scenario 420, a low-end (e.g., reduced capacity, or “RedCap”) target UE may obtain the assistance of premium UEs to determine its location using, e.g., sidelink positioning and ranging procedures with the premium UEs. Compared to the low-end UE, the premium UEs may have more capabilities, such as more sensors, a faster processor, more memory, more antenna elements, higher transmit power capability, access to additional frequency bands, or any combination thereof. In scenario 430, a relay UE (e.g., with a known location) participates in the positioning estimation of a remote UE without performing uplink positioning reference signal (PRS) transmission over the Uu interface. Scenario 440 illustrates the joint positioning of multiple UEs. Specifically, in scenario 440, two UEs with unknown positions can be jointly located in non-line-of-sight (NLOS) conditions by utilizing constraints from nearby UEs.

Figure 4B:
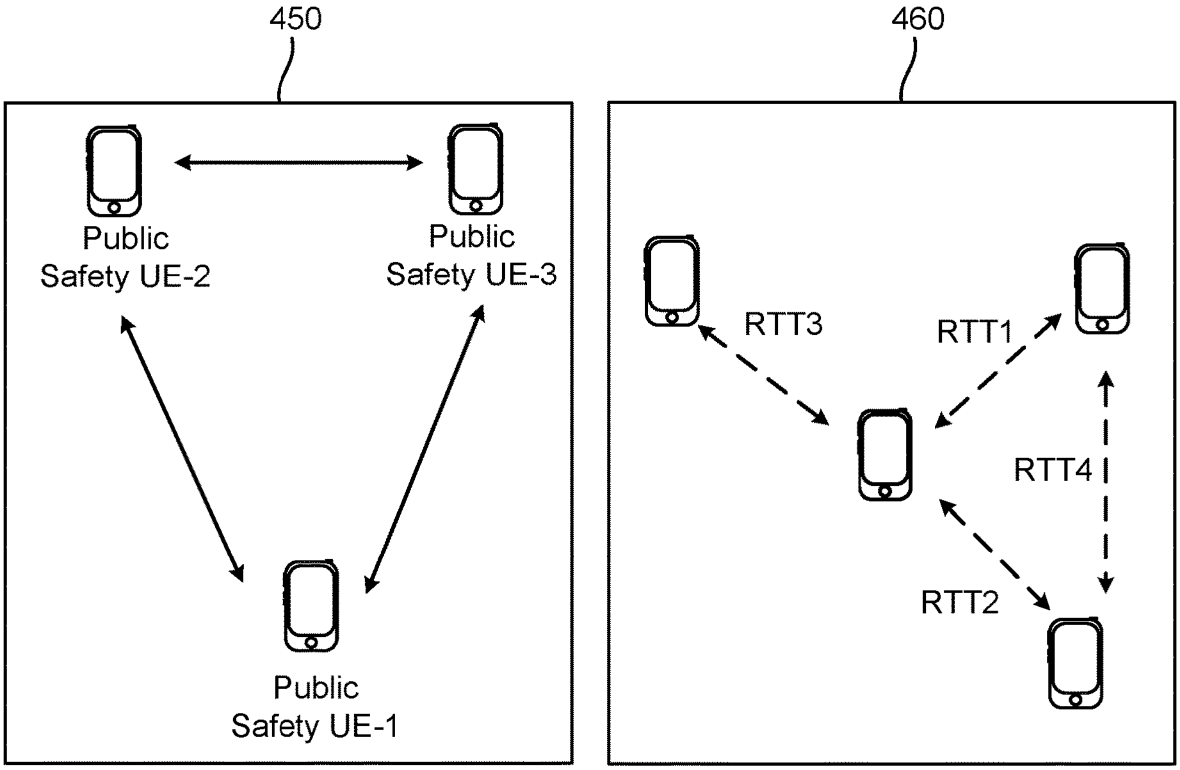

FIG. 4B illustrates additional scenarios of interest for sidelink-only or joint Uu and sidelink positioning, according to aspects of the disclosure. In scenario 450, UEs used for public safety (e.g., by police, firefighters, and/or the like) may perform peer-to-peer (P2P) positioning and ranging for public safety and other uses. For example, in scenario 450, the public safety UEs may be out of coverage of a network and determine a location or a relative distance and a relative position among the public safety UEs using sidelink positioning techniques. Similarly, scenario 460 shows multiple UEs that are out of coverage and determine a location or a relative distance and a relative position using sidelink positioning techniques, such as SL-RTT.

Referring to sidelink ranging techniques in greater detail, sidelink-based ranging and positioning (SLRP) enables the determination of the relative distance(s) between UEs and optionally their absolute position(s), where the absolute position of at least one involved UE is known. This technique is valuable in situations where global navigation satellite system (GNSS) positioning is degraded or unavailable (e.g., tunnels, urban canyons, etc.) and can also enhance range and positioning accuracy when GNSS is available.

SLRP is based on calculating an inter-UE round-trip-time (RTT) measurement, as determined from the transmit and receive times of sidelink positioning reference signals (SL-PRS) (a wideband positioning signal defined for sidelink-based positioning). Each UE reports an RTT measurement to all other participating UEs, along with its location (if known). For UEs having zero or inaccurate knowledge of their location, the RTT procedure yields an inter-UE range between the involved UEs. For UEs having accurate knowledge of their location, the range yields an absolute position.

Figure 5:
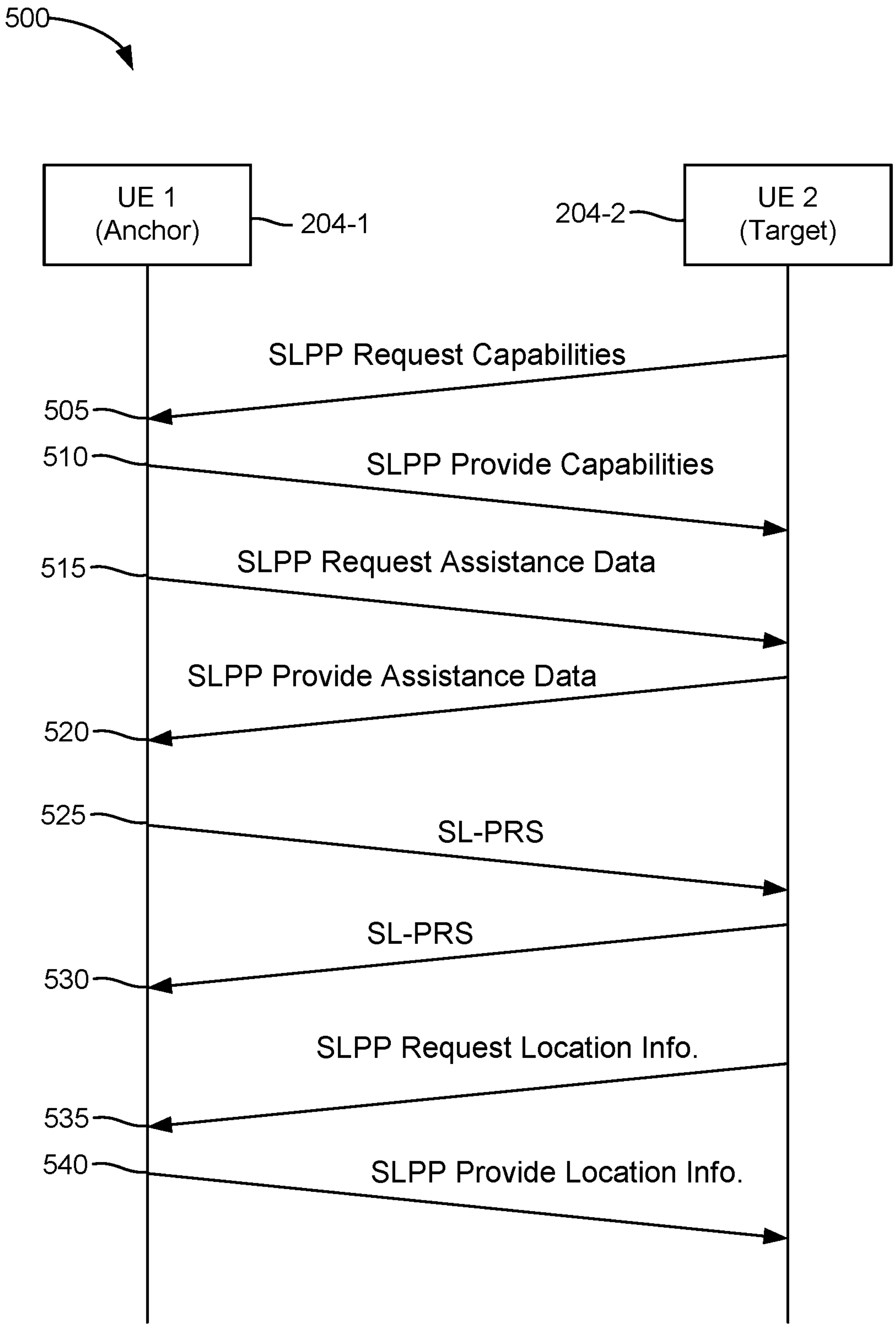
FIG. 5 illustrates an example sidelink ranging and positioning procedure, according to aspects of the disclosure.

FIG. 5 illustrates an example sidelink-based ranging and positioning (SLRP) procedure 500, according to aspects of the disclosure. An SLRP procedure 500 is established using the Sidelink Positioning Protocol (SLPP) to identify participating UEs, perform session establishment, and exchange measurements and measurement results. SLPP reuses the basic Long-Term Evolution (LTE) positioning protocol (LPP) message constructs of Request/Provide Capabilities, Request/Provide Assistance Data, and Request/Provide Location Information.

An SLRP procedure 500 (or session) begins with a target UE 204-2 (a UE with an unknown or inaccurate location that is attempting to be located) transmitting, at stage 505, an SLPP Request Capabilities message requesting capability information from one or more peer UEs. As shown in FIG. 5, at least one of the peer UEs, UE 204-1, is capable of being an anchor UE for the SLRP procedure 500. As such, at stage 510, the anchor UE 204-1 responds with an SLPP Provide Capabilities message that includes an indication that it is capable of being an anchor UE for the SLRP procedure 500. The SLPP Provide Capabilities message may also include the location of the anchor UE 204-1, or this may be provided later.

At stage 515, after the initial capability exchange, the anchor UE 204-1 transmits an SLPP Request Assistance Data message to the target UE 204-2. At stage 520, the target UE 204-2 transmits an SLPP Provide Assistance Data message to the anchor UE 204-1, which may include the configuration of one or more SL-PRS resources to be transmitted by the anchor UE 204-1 for measurement by the target UE 204-2 for the SLRP procedure 500. Alternatively or additionally, the SLPP Provide Assistance Data message may include configuration information for one or more SL-PRS resources to be transmitted by the target UE 204-2 for measurement by the anchor UE 204-1. In some cases (not shown), the target UE 204-2 may transmit an SLPP Request Assistance Data message to the anchor UE 204-1 to obtain configuration information for the one or more SL-PRS resources transmitted by the anchor UE 204-1 for measurement by the target UE 204-2. The target UE 204-2 provides the requested configuration information in an SLPP Provide Assistance Data message. In some cases, the respective UE 204 may not transmit an SLPP Request Assistance Data message, but instead, only the SLPP Provide Assistance Data message.

At stages 525 and 530, the involved peer UEs 204 transmit the configured SL-PRS resources to each other. Alternatively, only the anchor UE 204-1 of the target UE 204-2 may transmit SL-PRS resources (e.g., in the case of a sidelink time-difference of arrival (SL-TDOA) procedure). The resources on which the SL-PRS are transmitted may be configured during the assistance data exchange(s) at stages 515 and 520. The anchor UE 204-1 measures the reception-to-transmission (Rx-Tx) time difference between the transmission time of the SL-PRS resource(s) at stage 525 and the reception time of the SL-PRS resource(s) at stage 530. Likewise, the target UE 204-2 measures the Rx-Tx time difference between the reception time of the SL-PRS resource(s) at stage 525 and the transmission time of the SL-PRS resource(s) at stage 530. Note that although FIG. 5 illustrates the anchor UE 204-1 transmitting SL-PRS first, the target UE 204-2 may instead transmit PRS first.

At stage 535, the target UE 204-2 transmits an SLPP Request Location Information message to the anchor UE 204-1. At stage 540, the anchor UE 204-1 responds with an SLPP Provide Location Information message that includes the Rx-Tx time difference measurement(s) obtained by the anchor UE 204-1. Alternatively or additionally (not shown), the anchor UE 204-1 may transmit an SLPP Request Location Information message to the target UE 204-2 and the target UE 204-2 may respond with an SLPP Provide Location Information message including the Rx-Tx time difference measurement(s) obtained by the target UE 204-2. If the anchor UE 204-1 has not yet provided its location to the target UE 204-2, it does so at this point.

The target UE 204-2 is then able to determine the RTT between itself and the anchor UE 204-1 based on the Rx-Tx time difference measurements. Based on the RTT measurement and the speed of light, the target UE 204-2 can then estimate the distance (or range) between the two UEs 204. If the target UE 204-2 also has the absolute location (e.g., geographic coordinates) of the anchor UE 204-1 and two or more additional anchor UEs 204-1, the target UE 204-2 can use that location and the distance to the anchor UEs 204-1 to determine its own absolute location (e.g., based on trilateration).

Note that while FIG. 5 illustrates one anchor UE 204-1, a target UE 204-2 may perform, or attempt to perform, the SLRP procedure 500 with multiple anchor UEs 204-1. Further, while FIG. 5 illustrates the SLPP Request Location Information being transmitted after the SL-PRS resources are transmitted, it may be transmitted before SL-PRS transmission.

In sidelink positioning, multiple UEs may simultaneously participate as part of a group ranging/positioning session, with the session conducted over any cast type (unicast, groupcast, broadcast). When Managed Groupcast is used for sidelink positioning, the application layer provides the lower layer (SLPP) with group information consisting of {Group Size, Group ID, Member IDs}. UEs in the group convert the Group ID to a Groupcast Destination Layer-2 ID for transmission/reception of SLPP messages among the group.

If the sidelink ranging/positioning capability exchange (e.g., stages 505 and 510 of FIG. 5) results in one or more of the UEs having incompatible sidelink positioning capabilities, there is no mechanism within the LPP basic messages to (1) inform the group which UEs are incompatible or (2) modify the group composition and create a new Groupcast Destination Layer-2 ID for the modified group.

Figure 6:
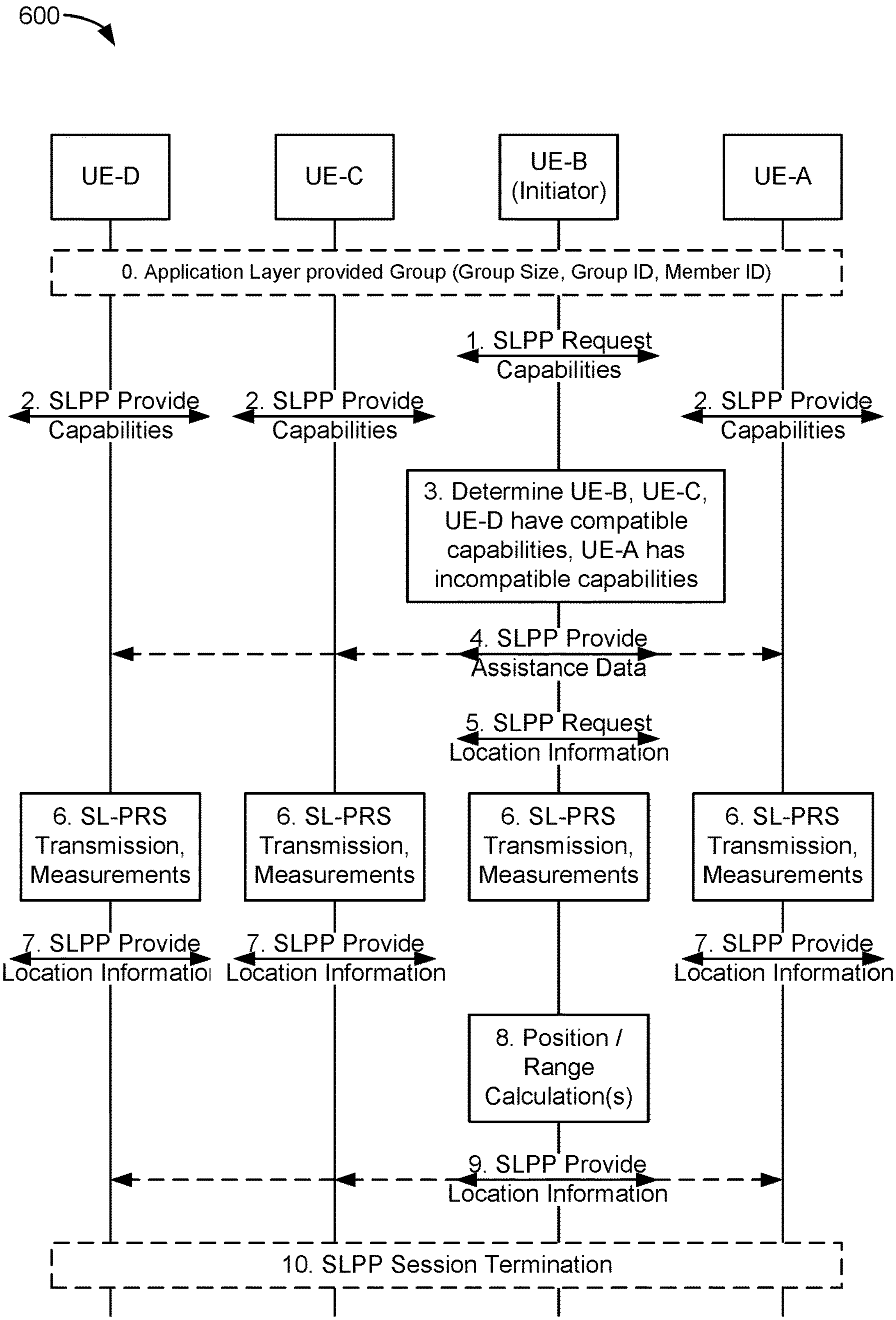
FIG. 6 is a diagram illustrating an example of sidelink positioning over managed groupcast, according to aspects of the disclosure.

FIG. 6 is a diagram 600 illustrating an example of sidelink positioning over managed groupcast, according to aspects of the disclosure. In the example of FIG. 6, four UEs (denoted UE-A, UE-B, UE-C, and UE-D) are members of a managed group for sidelink positioning. UE-B is the initiator UE and the remaining UEs are target UEs.

At stage 0, UE-B's application layer provides the managed group definition to UE-B's SLPP layer for sidelink positioning via managed groupcast. The managed group definition includes identifiers of the managed group members (here, UE-A, UE-B, UE-C, UE-D), a group ID, and the group size (here, four). All UEs in the managed group (UE-A, UE-B, UE-C, UE-D) derive the Groupcast Destination Layer-2 ID for the managed group using the group ID.

At stage 1, UE-B transmits an SLPP Request Capabilities message (e.g., as at stage 505 of FIG. 5) via groupcast to the target UEs (UE-A, UE-C, UE-D). The SLPP Request Capabilities message is transmitted to the Groupcast Destination Layer-2 ID for the managed group.

At stage 2, each target UE (UE-A, UE-C, UE-D) transmits a reply via groupcast to the Groupcast Destination Layer-2 ID of the managed group. Here, the replies are SLPP Provide Capabilities messages (e.g., as at stage 510 of FIG. 5).

At stage 3, the initiator UE (UE-B) determines, based on the SLPP Provide Capabilities messages received at stage 2, that UE-B, UE-C, and UE-D have compatible sidelink positioning capabilities but that UE-A has incompatible capabilities. However, in the example of FIG. 6, incompatible UEs are not excluded, resulting in unnecessary transmissions and extraneous and/or incorrect data.

At stage 4, UE-B transmits an SLPP Provide Assistance Data message (e.g., as at stage 520 of FIG. 5) via groupcast to the target UEs (UE-A, UE-C, UE-D). The SLPP Provide Assistance Data does not indicate compatible UEs.

At stage 5, UE-B transmits an SLPP Request Location Information message (e.g., as at stage 535 of FIG. 5) via groupcast to the target UEs (UE-A, UE-C, UE-D). At stage 6, each UE in the managed group (UE-A, UE-B, UE-C, UE-D) transmits and measures SL-PRS (e.g., as at stages 525 and 530 of FIG. 5). At stage 7, each target UE (UE-A, UE-C, UE-D) transmits an SLPP Provide Location Information message (e.g., as at stage 540 of FIG. 5) via groupcast to the Groupcast Destination Layer-2 ID of the managed group.

At stage 8, the initiator UE (UE-B) uses the target UE capabilities and SL-PRS measurements reported by the target UEs to determine range and position information. Without a mechanism to remove UE-A from the group, or a mechanism to inform UE-A not to participate in the sidelink positioning measurements, UE-B will attempt to calculate range and/or position for UE-A.

At stage 9, the initiator UE (UE-B) optionally transmits a SLPP Provide Location Information message to the target UEs (UE-A, UE-C, UE-D) via groupcast. The SLPP Provide Location Information message includes the positioning results for the UE-A, despite UE-A having incompatible capabilities. At stage 10, the SLPP session is terminated.

Prior techniques have disclosed mechanisms to modify a sidelink ranging/positioning session group composition by introducing additional (new) SLPP messages beyond the basic set of three LPP-like procedures (i.e., SLPP Request/Provide Capabilities, SLPP Request/Provide Assistance Data, SLPP Request/Provide Location Information). However, rather than introducing new messages, it may be beneficial to enhance/augment an existing message, such as the SLPP Provide Assistance Data message.

The present disclosure provides a mechanism for using the SLPP Provide Assistance Data message to indicate compatible UEs (member IDs) in an application-layer provided Managed Groupcast group that are part of the sidelink positioning group, based on the result of the SLPP Request/Provide Capabilities message exchange. That is, the disclosed mechanism informs the members of the SLPP managed groupcast session of the subset of UEs having compatible sidelink positioning capabilities and directs those UEs with incompatible capabilities to not transmit SL-PRS or SLPP messages to the group. This does not remove the UEs with incompatible capabilities from the groupcast transmission (i.e., the Groupcast Destination Layer-2 ID for managed groupcast is not modified), but instead, informs those incompatible UEs that they should not respond to SLPP messages for this specific positioning session.

A benefit of this mechanism is to direct those UEs that are (temporarily) no longer part of the group not to transmit or participate in any subsequent sidelink ranging/positioning transactions for this positioning group, eliminating incompatible positioning input and doing so without introducing new over-the-air messaging.

Figure 7:
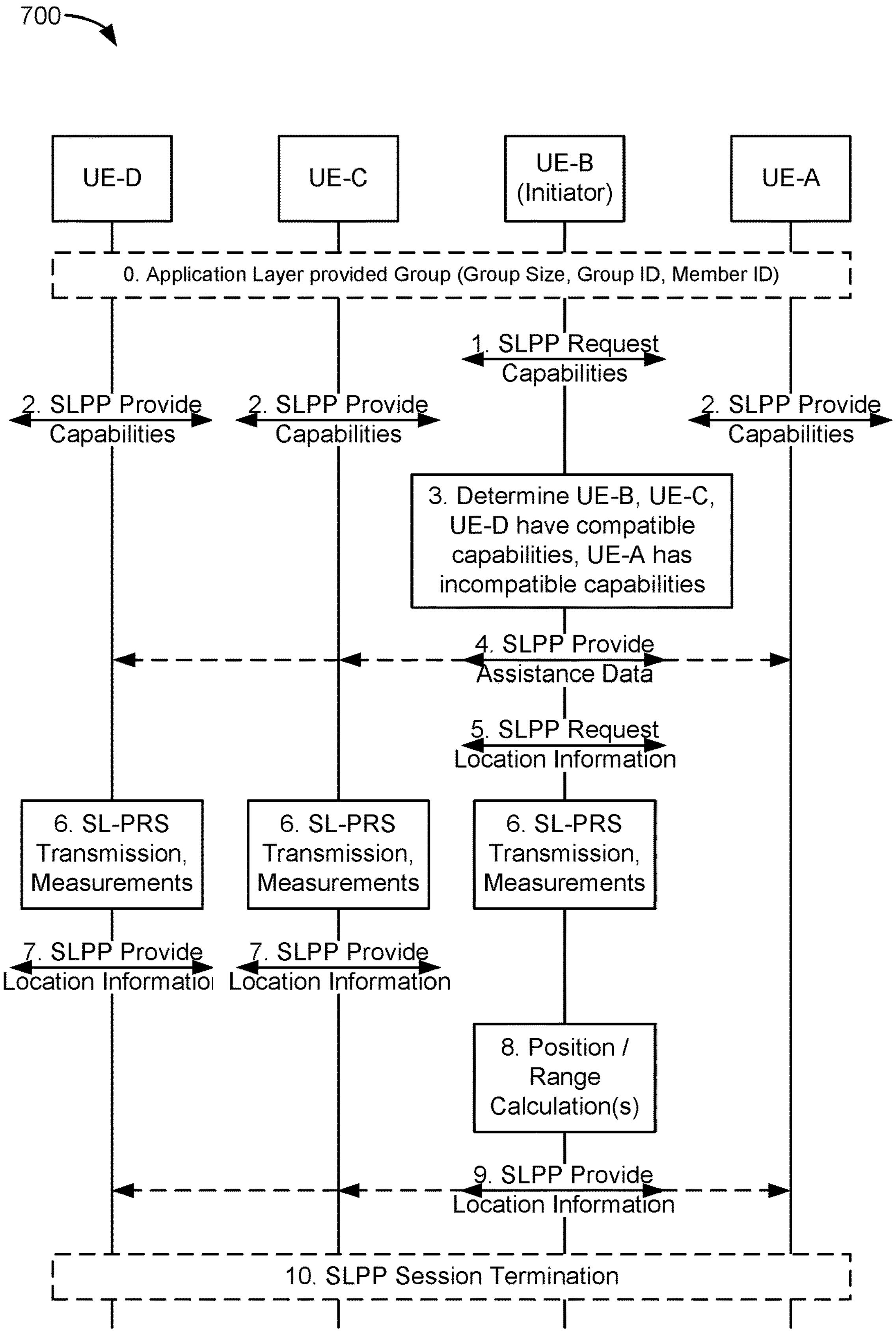
FIG. 7 is a diagram illustrating an example sidelink positioning session over managed groupcast using a modified Sidelink Positioning Protocol (SLPP) Provide Assistance Data message, according to aspects of the disclosure.

FIG. 7 is a diagram 700 illustrating an example sidelink positioning session over managed groupcast using a modified SLPP Provide Assistance Data message, according to aspects of the disclosure. As in FIG. 6, in the example of FIG. 7, four UEs (denoted UE-A, UE-B, UE-C, and UE-D) are members of a managed group for sidelink positioning. UE-B is the initiator UE and the remaining UEs are target UEs. In the example of FIG. 7, incompatible UEs are excluded, resulting in reduced transmissions and exclusion of extraneous and/or incorrect data.

At stage 0, UE-B's application layer provides the managed group definition to UE-B's SLPP layer for sidelink positioning via managed groupcast. The managed group definition includes identifiers of the managed group members (here, UE-A, UE-B, UE-C, UE-D), a group ID, and the group size (here, four). All UEs in the managed group (UE-A, UE-B, UE-C, UE-D) derive the Groupcast Destination Layer-2 ID for the managed group using the group ID.

At stage 1, UE-B transmits an SLPP Request Capabilities message (e.g., as at stage 505 of FIG. 5) via groupcast to the target UEs (UE-A, UE-C, UE-D). The SLPP Request Capabilities message is transmitted to the Groupcast Destination Layer-2 ID for the managed group.

At stage 2, each target UE (UE-A, UE-C, UE-D) transmits a reply via groupcast to the Groupcast Destination Layer-2 ID of the managed group. Here, the replies are SLPP Provide Capabilities messages (e.g., as at stage 510 of FIG. 5).

At stage 3, the initiator UE (UE-B) determines, based on the SLPP Provide Capabilities messages received at stage 2, that UE-B, UE-C, and UE-D have compatible sidelink positioning capabilities but that UE-A has incompatible capabilities.

At stage 4, UE-B transmits an SLPP Provide Assistance Data message (e.g., as at stage 520 of FIG. 5) via groupcast to the target UEs (UE-A, UE-C, UE-D). In contrast to stage 4 of FIG. 6, here, the SLPP Provide Assistance Data message indicates the set of UEs that are to participate in the sidelink positioning session (i.e., the set of UEs with compatible capabilities), that is, UE-B, UE-C, and UE-D. As such, UE-A will not transmit SL-PRS for the sidelink positioning session or participate in subsequent SLPP positioning messages/transactions.

At stage 5, UE-B transmits an SLPP Request Location Information message (e.g., as at stage 535 of FIG. 5) via groupcast to the target UEs (UE-A, UE-C, UE-D). At stage 6, only the UEs indicated in the SLPP Provide Assistance Data message (UE-B, UE-C, UE-D) transmit and measure SL-PRS (e.g., as at stages 525 and 530 of FIG. 5). At stage 7, only the target UEs indicated in the SLPP Provide Assistance Data message (UE-C, UE-D) transmit an SLPP Provide Location Information message (e.g., as at stage 540 of FIG. 5) via groupcast to the Groupcast Destination Layer-2 ID of the managed group.

At stage 8, the initiator UE (UE-B) uses the target UE capabilities and SL-PRS measurements reported by the target UEs to determine range and position information. Unlike stage 8 of FIG. 6, here, the initiator UE (UE-B) does not calculate range and/or position for UE-A.

At stage 9, the initiator UE (UE-B) optionally transmits an SLPP Provide Location Information message to the target UEs (UE-A, UE-C, UE-D) via groupcast. The SLPP Provide Location Information message does not include the positioning results for UE-A. At stage 10, the SLPP session is terminated.

FIG. 8 illustrates an example SLPP Provide Assistance Data information element (IE), according to aspects of the disclosure. This information element enumerates the UEs with compatible sidelink positioning capabilities. For example, the "sl-SLPPMemberList" IE can be included in the SLPP Provide Assistance Data message to list the managed groupcast member IDs with compatible sidelink positioning capabilities.

The above approach does not explicitly remove the incompatible UEs from the managed groupcast group, meaning the UEs with compatible capabilities will continue to transmit to all UEs in the group, which requires incompatible UEs to process messages transmitted to the group. Modifying the sidelink positioning session managed groupcast group composition would reduce participant UE processing and over-the-air resource utilization, resulting in more efficient sidelink positioning.

The present disclosure provides a mechanism for the initiator (or organizer) of a sidelink positioning session to create a new managed groupcast group identifier (Group ID) for the subset of UEs having compatible capabilities and distribute the new Group ID to session participants. The new group information can be distributed to UEs using the SLPP Provide Assistance Data message or a new SLPP message. Those UEs in the revised group are subsequently able to derive a new Groupcast Destination Layer-2 ID for managed groupcast to the revised positioning group.

The benefit of this mechanism is to restrict the managed groupcast to only those UEs with compatible sidelink positioning capabilities, thereby limiting groupcast transmission only to those UEs with compatible capabilities and reducing the processing burden on UEs with incompatible capabilities.

Figure 9:
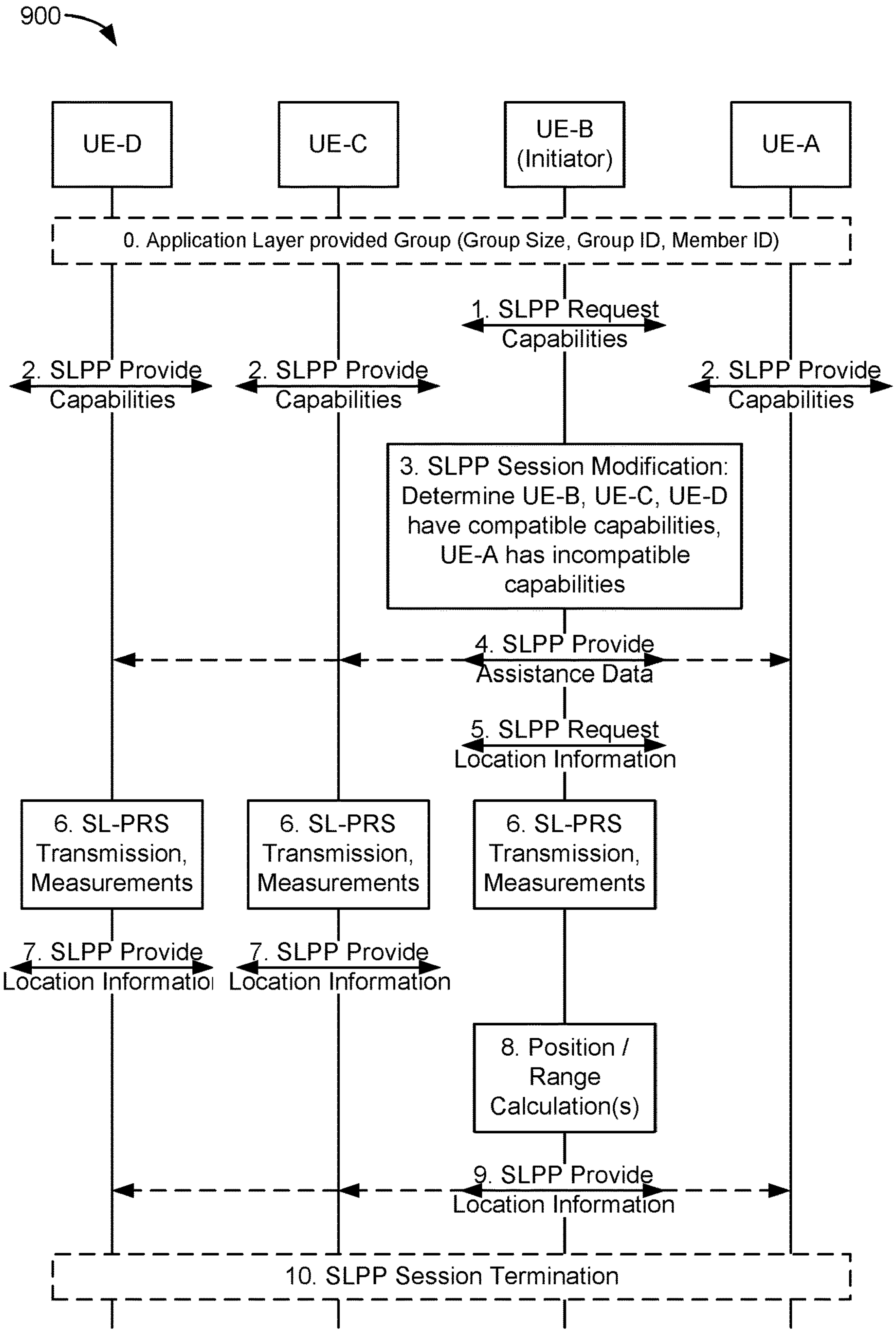
FIG. 9 is a diagram illustrating an example of modifying a sidelink positioning session over managed groupcast using a SLPP Provide Assistance Data message, according to aspects of the disclosure.

FIG. 9 is a diagram 900 illustrating an example of modifying a sidelink positioning session over managed groupcast using a SLPP Provide Assistance Data message, according to aspects of the disclosure. As in FIG. 6, in the example of FIG. 9, four UEs (denoted UE-A, UE-B, UE-C, and UE-D) are members of a managed group for sidelink positioning. UE-B is the initiator UE and the remaining UEs are target UEs. In the example of FIG. 9, incompatible UEs are removed from the managed groupcast group, resulting in reduced transmissions and exclusion of extraneous and/or incorrect data.

At stage 0, UE-B's application layer provides the managed group definition to UE-B's SLPP layer for sidelink positioning via managed groupcast. The managed group definition includes identifiers of the managed group members (here, UE-A, UE-B, UE-C, UE-D), a group ID, and the group size (here, four). All UEs in the managed group (UE-A, UE-B, UE-C, UE-D) derive the Groupcast Destination Layer-2 ID for the managed group using the group ID.

At stage 1, UE-B transmits an SLPP Request Capabilities message (e.g., as at stage 505 of FIG. 5) via groupcast to the target UEs (UE-A, UE-C, UE-D). The SLPP Request Capabilities message is transmitted to the Groupcast Destination Layer-2 ID for the managed group.

At stage 2, each target UE (UE-A, UE-C, UE-D) transmits a reply via groupcast to the Groupcast Destination Layer-2 ID of the managed group. Here, the replies are SLPP Provide Capabilities messages (e.g., as at stage 510 of FIG. 5).

At stage 3, the initiator UE (UE-B) determines, based on the SLPP Provide Capabilities messages received at stage 2, that UE-B, UE-C, and UE-D have compatible sidelink positioning capabilities but that UE-A has incompatible capabilities. As such, UE-B modifies the positioning session by creating a new managed groupcast group identifier (Groupcast Destination Layer-2 ID) for the subset of UEs with compatible capabilities.

At stage 4, UE-B transmits an SLPP Provide Assistance Data message (e.g., as at stage 520 of FIG. 5) via groupcast to the original target UEs (UE-A, UE-C, UE-D) (i.e., to the original Groupcast Destination Layer-2 ID). In contrast to stage 4 of FIG. 7, here, the SLPP Provide Assistance Data message indicates the set of UEs that are part of the new (updated/revised) positioning group (i.e., the set of UEs with compatible capabilities, here, UE-B, UE-C, UE-D) and the new (updated/revised) Groupcast Destination Layer-2 ID. Based on the received SLPP Provide Assistance Data message, UE-A knows it is not part of the new SLPP positioning group. As such, UE-A will not transmit SL-PRS for the sidelink positioning session or participate in subsequent SLPP positioning messages/transactions.

At stage 5, UE-B transmits an SLPP Request Location Information message (e.g., as at stage 535 of FIG. 5) via groupcast to the new target UEs (UE-C, UE-D), that is, to the new Groupcast Destination Layer-2 ID. At stage 6, only the UEs in the new managed group (UE-B, UE-C, UE-D) transmit and measure SL-PRS (e.g., as at stages 525 and 530 of FIG. 5). At stage 7, only the target UEs indicated in the SLPP Provide Assistance Data message (UE-C, UE-D) transmit an SLPP Provide Location Information message (e.g., as at stage 540 of FIG. 5) via groupcast to the new Groupcast Destination Layer-2 ID of the new managed group.

At stage 8, the initiator UE (UE-B) uses the target UE capabilities and SL-PRS measurements reported by the new target UEs to determine range and position information. Like stage 8 of FIG. 7, the initiator UE (UE-B) does not calculate range and/or position for UE-A.

At stage 9, the initiator UE (UE-B) optionally transmits an SLPP Provide Location Information message to the new target UEs (UE-C, UE-D) via groupcast to the new Groupcast Destination Layer-2 ID. The SLPP Provide Location Information message does not include the positioning results for UE-A. At stage 10, the SLPP session is terminated.

Figure 10:
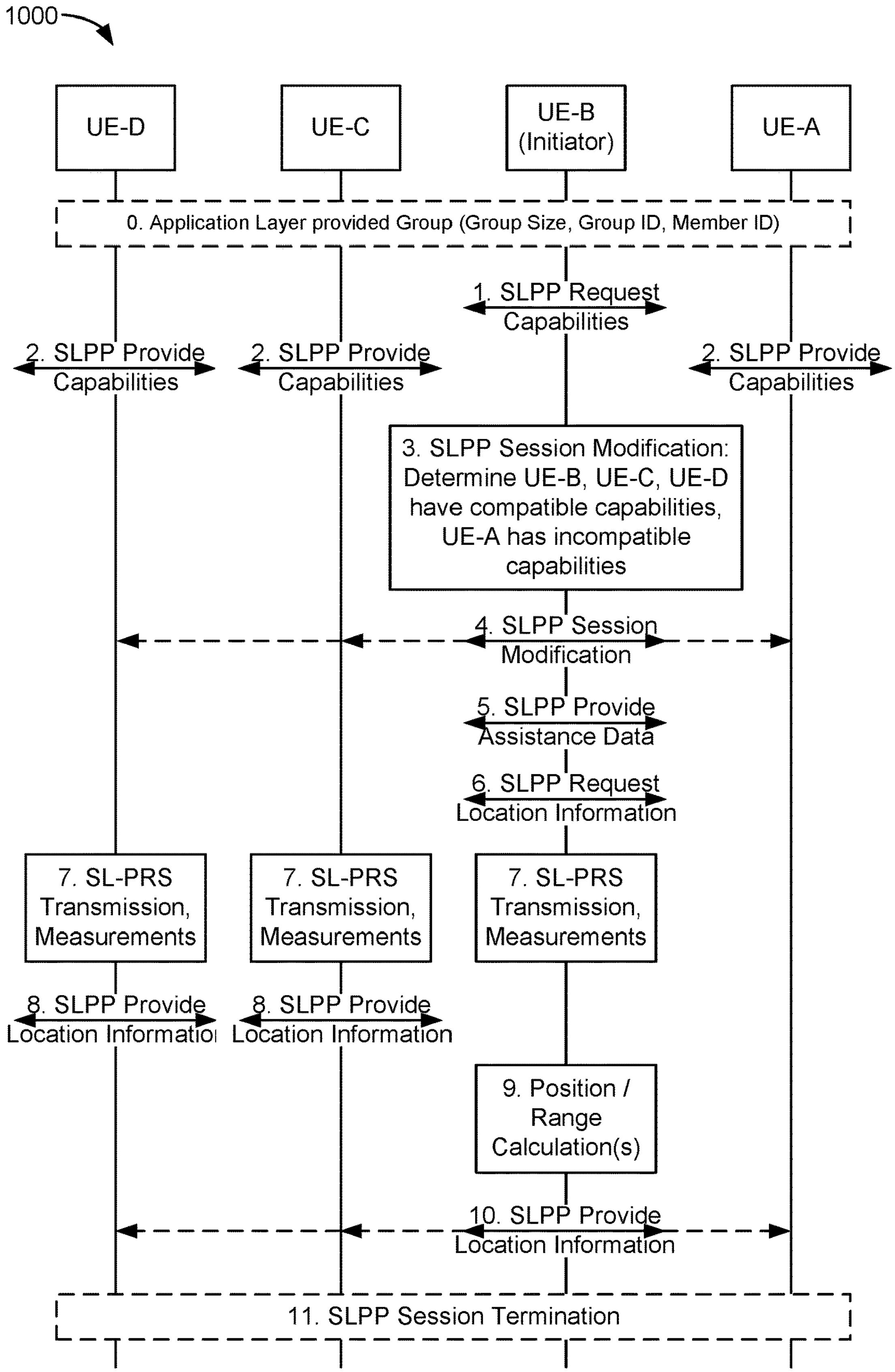
FIG. 10 is a diagram illustrating an example of modifying a sidelink positioning session over managed groupcast using a specific session modification SLPP message, according to aspects of the disclosure.

FIG. 10 is a diagram 1000 illustrating an example of modifying a sidelink positioning session over managed groupcast using a specific session modification SLPP message, according to aspects of the disclosure. As in FIG. 6, in the example of FIG. 9, four UEs (denoted UE-A, UE-B, UE-C, and UE-D) are members of a managed group for sidelink positioning. UE-B is the initiator UE and the remaining UEs are target UEs. In the example of FIG. 10, incompatible UEs are removed from the managed groupcast group, resulting in reduced transmissions and exclusion of extraneous and/or incorrect data.

At stage 0, UE-B's application layer provides the managed group definition to UE-B's SLPP layer for sidelink positioning via managed groupcast. The managed group definition includes identifiers of the managed group members (here, UE-A, UE-B, UE-C, UE-D), a group ID, and the group size (here, four). All UEs in the managed group (UE-A, UE-B, UE-C, UE-D) derive the Groupcast Destination Layer-2 ID for the managed group using the group ID.

At stage 1, UE-B transmits an SLPP Request Capabilities message (e.g., as at stage 505 of FIG. 5) via groupcast to the target UEs (UE-A, UE-C, UE-D). The SLPP Request Capabilities message is transmitted to the Groupcast Destination Layer-2 ID for the managed group.

At stage 2, each target UE (UE-A, UE-C, UE-D) transmits a reply via groupcast to the Groupcast Destination Layer-2 ID of the managed group. Here, the replies are SLPP Provide Capabilities messages (e.g., as at stage 510 of FIG. 5).

At stage 3, the initiator UE (UE-B) determines, based on the SLPP Provide Capabilities messages received at stage 2, that UE-B, UE-C, and UE-D have compatible sidelink positioning capabilities but that UE-A has incompatible capabilities. As such, UE-B modifies the positioning session by creating a new managed groupcast group identifier (Groupcast Destination Layer-2 ID) for the subset of UEs with compatible capabilities.

At stage 4, the initiator UE (UE-B) transmits an SLPP message to modify the current sidelink positioning session (denoted, for example, "SLPP Session Modification"). The SLPP session modification message is transmitted to the original Groupcast Destination Layer-2 ID and indicates the set of UEs that are part of the new (updated/revised) positioning group (i.e., the set of UEs with compatible capabilities, here, UE-B, UE-C, UE-D) and the new (updated/revised) Groupcast Destination Layer-2 ID. Based on the received SLPP session modification message, UE-A knows it is not part of the new SLPP positioning group. As such, UE-A will not transmit SL-PRS for the sidelink positioning session or participate in subsequent SLPP positioning messages/transactions.

At stage 5, the initiator UE (UE-B) transmits an SLPP Provide Assistance Data message (e.g., as at stage 520 of FIG. 5) for the positioning session to the new target UEs (UE-C, UE-D) via groupcast (i.e., to the new Groupcast Destination Layer-2 ID).

At stage 6, UE-B transmits an SLPP Request Location Information message (e.g., as at stage 535 of FIG. 5) via groupcast to the new target UEs (UE-C, UE-D), that is, to the new Groupcast Destination Layer-2 ID. At stage 7, only the UEs in the new managed group (UE-B, UE-C, UE-D) transmit and measure SL-PRS (e.g., as at stages 525 and 530 of FIG. 5). At stage 8, only the target UEs indicated in the SLPP Provide Assistance Data message (UE-C, UE-D) transmit an SLPP Provide Location Information message (e.g., as at stage 540 of FIG. 5) via groupcast to the new Groupcast Destination Layer-2 ID of the new managed group.

At stage 9, the initiator UE (UE-B) uses the target UE capabilities and SL-PRS measurements reported by the new target UEs to determine range and position information. Like stage 8 of FIG. 7, the initiator UE (UE-B) does not calculate range and/or position for UE-A.

At stage 10, the initiator UE (UE-B) optionally transmits an SLPP Provide Location Information message to the new target UEs (UE-C, UE-D) via groupcast to the new Groupcast Destination Layer-2 ID. The SLPP Provide Location Information message does not include the positioning results for UE-A. At stage 11, the SLPP session is terminated.

FIG. 11 illustrates an example SLPP positioning group information element (IE), according to aspects of the disclosure. The illustrated "sl-SLPPGroupInformation" IE can be included in an SLPP Provide Assistance Data message (e.g., the SLPP Provide Assistance Data message transmitted at stage 4 of FIG. 9), or can be included in a session modification SLPP message (e.g., the SLPP Session Modification message transmitted at stage 4 of FIG. 10). The IE provides the managed groupcast group information for the subset of UEs having common capabilities for a sidelink positioning session. The group information consists of {Group ID, Group Size, Member IDs}.

Figure 12:
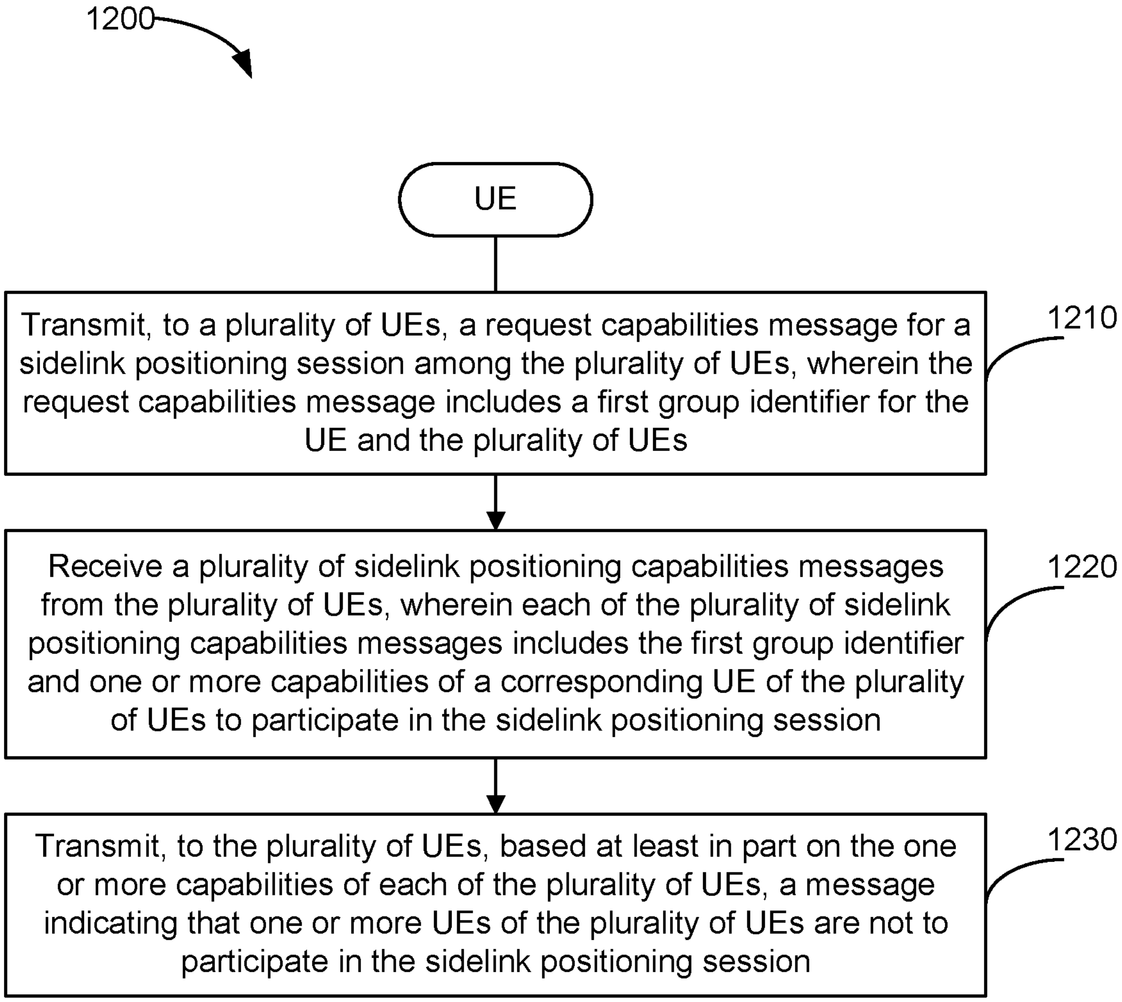
FIGS. 12 and 13 illustrate example methods of wireless communication, according to aspects of the disclosure.

FIG. 12 illustrates an example method 1200 of wireless communication, according to aspects of the disclosure. In an aspect, method 1200 may be performed by a UE (e.g., any of the UEs described herein).

At 1210, the UE transmits, to a plurality of UEs, a request capabilities message for a sidelink positioning session among the plurality of UEs, wherein the request capabilities message includes a first group identifier for the UE and the plurality of UEs. In an aspect, operation 1210 may be performed by the one or more WWAN transceivers 310, the one or more short-range wireless transceivers 320, the one or more processors 332, memory 340, and/or positioning component 342, any or all of which may be considered means for performing this operation.

At 1220, the UE receives a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session. In an aspect, operation 1220 may be performed by the one or more WWAN transceivers 310, the one or more short-range wireless transceivers 320, the one or more processors 332, memory 340, and/or positioning component 342, any or all of which may be considered means for performing this operation.

At 1230, the UE transmits, to the plurality of UEs, based at least in part on the one or more capabilities of each of the plurality of UEs, a message indicating that one or more UEs of the plurality of UEs are not to participate in the sidelink positioning session. In an aspect, operation 1230 may be performed by the one or more WWAN transceivers 310, the one or more short-range wireless transceivers 320, the one or more processors 332, memory 340, and/or positioning component 342, any or all of which may be considered means for performing this operation.

Figure 13:
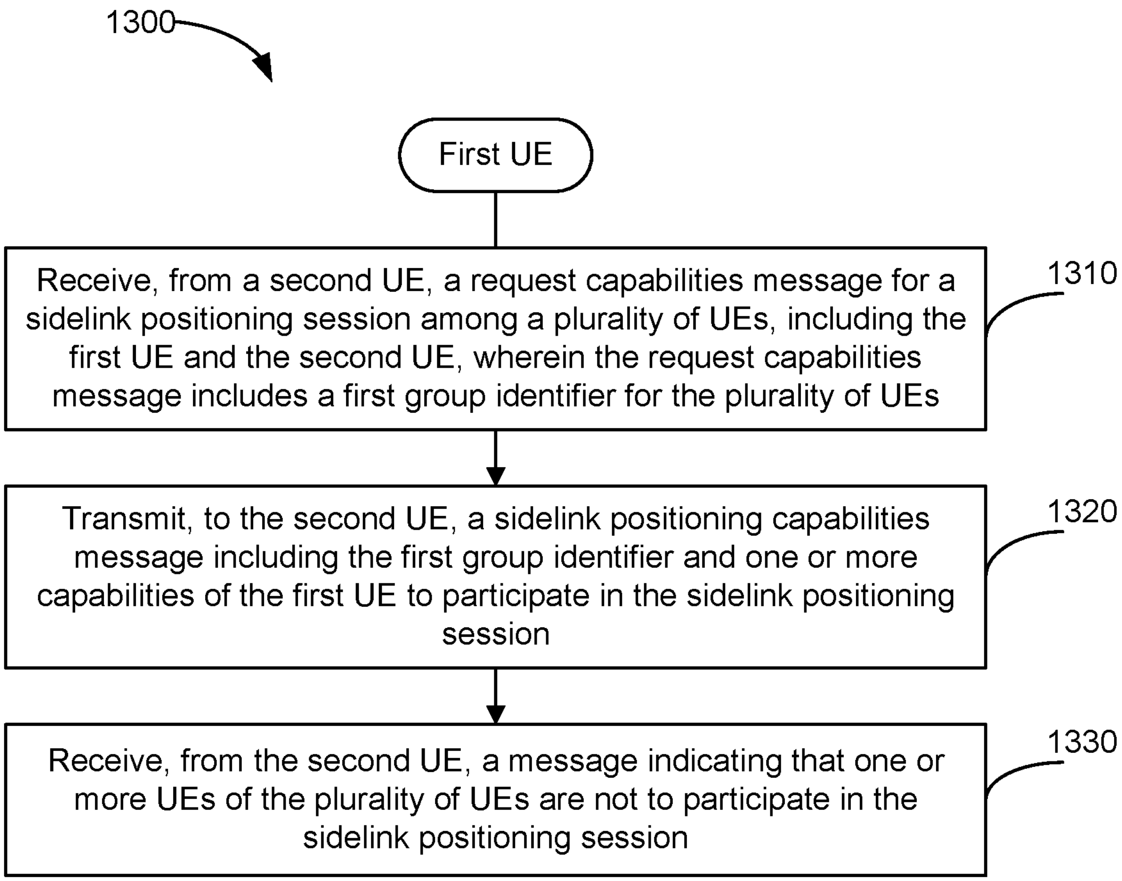

FIG. 13 illustrates an example method 1300 of wireless communication, according to aspects of the disclosure. In an aspect, method 1300 may be performed by a first UE (e.g., any of the UEs described herein).

At 1310, the first UE receives, from a second UE, a request capabilities message for a sidelink positioning session among a plurality of UEs, including the first UE and the second UE, wherein the request capabilities message includes a first group identifier for the plurality of UEs. In an aspect, operation 1310 may be performed by the one or more WWAN transceivers 310, the one or more short-range wireless transceivers 320, the one or more processors 332, memory 340, and/or positioning component 342, any or all of which may be considered means for performing this operation.

At 1320, the first UE transmits, to the second UE, a sidelink positioning capabilities message including the first group identifier and one or more capabilities of the first UE to participate in the sidelink positioning session. In an aspect, operation 1320 may be performed by the one or more WWAN transceivers 310, the one or more short-range wireless transceivers 320, the one or more processors 332, memory 340, and/or positioning component 342, any or all of which may be considered means for performing this operation.

At 1330, the first UE receives, from the second UE, a message indicating that one or more UEs of the plurality of UEs are not to participate in the sidelink positioning session. In an aspect, operation 1330 may be performed by the one or more WWAN transceivers 310, the one or more short-range wireless transceivers 320, the one or more processors 332, memory 340, and/or positioning component 342, any or all of which may be considered means for performing this operation.

As will be appreciated, technical advantages of the method 1200 and 1300 include reduced transmissions, reduced utilization of over-the-air resources, lessened congestion, reduced processing of extraneous and/or unnecessary data.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: transmitting, to a plurality of UEs, a request capabilities message for a sidelink positioning session among the plurality of UEs, wherein the request capabilities message includes a first group identifier for the UE and the plurality of UEs; receiving a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session; and transmitting, to the plurality of UEs, based at least in part on the one or more capabilities of each of the plurality of UEs, a message indicating that one or more UEs of the plurality of UEs are not to participate in the sidelink positioning session.

Clause 2. The method of clause 1, further comprising: determining that the one or more capabilities of each of the one or more UEs are incompatible with performance of the sidelink positioning session.

Clause 3. The method of any of clauses 1 to 2, wherein the message indicating that the one or more UEs are not to participate in the sidelink positioning session comprises the message including: identifiers of remaining UEs of the plurality of UEs other than the one or more UEs, or identifiers of the one or more UEs.

Clause 4. The method of any of clauses 1 to 3, wherein the message further includes the first group identifier.

Clause 5. The method of any of clauses 1 to 4, wherein the message further includes a second group identifier for the UE and remaining UEs of the plurality of UEs other than the one or more UEs.

Clause 6. The method of any of clauses 1 to 5, wherein the message is: a provide assistance data message for the sidelink positioning session or a request location information message for the sidelink positioning session.

Clause 7. The method of clause 6, wherein: the provide assistance data message is a sidelink positioning protocol (SLPP) Provide Assistance Data message, and the request location information message is an SLPP Request Location Information message.

Clause 8. The method of any of clauses 1 to 7, wherein the message is a positioning session modification message.

Clause 9. The method of clause 8, wherein the positioning session modification message is an SLPP message modifying the sidelink positioning session.

Clause 10. The method of any of clauses 1 to 9, further comprising: transmitting a request location information message to remaining UEs of the plurality of UEs other than the one or more UEs.

Clause 11. The method of clause 10, wherein the request location information message is an SLPP Request Location Information message.

Clause 12. The method of any of clauses 1 to 11, wherein the first group identifier is a Managed Groupcast Group Identifier.

Clause 13. The method of any of clauses 1 to 12, wherein: the request capabilities message is an SLPP Request Capabilities message, and the plurality of sidelink positioning capabilities messages is a plurality of SLPP Provide Capabilities messages.

Clause 14. A method of wireless communication performed by a first user equipment (UE), comprising: receiving, from a second UE, a request capabilities message for a sidelink positioning session among a plurality of UEs, including the first UE and the second UE, wherein the request capabilities message includes a first group identifier for the plurality of UEs; transmitting, to the second UE, a sidelink positioning capabilities message including the first group identifier and one or more capabilities of the first UE to participate in the sidelink positioning session; and receiving, from the second UE, a message indicating that one or more UEs of the plurality of UEs are not to participate in the sidelink positioning session.

Clause 15. The method of clause 14, wherein the message indicating that the one or more UEs are not to participate in the sidelink positioning session comprises the message including: identifiers of remaining UEs of the plurality of UEs other than the one or more UEs, or identifiers of the one or more UEs.

Clause 16. The method of any of clauses 14 to 15, wherein the message further includes the first group identifier.

Clause 17. The method of any of clauses 14 to 16, wherein the message further includes a second group identifier for the UE and remaining UEs of the plurality of UEs other than the one or more UEs.

Clause 18. The method of any of clauses 14 to 17, wherein the message is: a provide assistance data message for the sidelink positioning session, or a request location information message for the sidelink positioning session.

Clause 19. The method of clause 18, wherein: the provide assistance data message is a sidelink positioning protocol (SLPP) Provide Assistance Data message, and the request location information message is an SLPP Request Location Information message.

Clause 20. The method of any of clauses 14 to 19, wherein the message is a positioning session modification message.

Clause 21. The method of clause 20, wherein the positioning session modification message is an SLPP message modifying the sidelink positioning session.

Clause 22. The method of any of clauses 14 to 21, wherein the first UE is one of the one or more UEs.

Clause 23. The method of clause 22, further comprising: receiving, from the second UE, a request location information message; refraining from responding to the request location information message based on the first UE being one of the one or more UEs; and receiving, from the second UE, a provide location information message, wherein the provide location information message does not include positioning results for the first UE.

Clause 24. The method of any of clauses 14 to 23, wherein the first UE is one of remaining UEs of the plurality of UEs other than the one or more UEs.

Clause 25. The method of clause 24, further comprising: receiving, from the second UE, a request location information message; and transmitting, to the second UE, a provide location information message.

Clause 26. The method of clause 25, wherein: the request location information message is an SLPP Request Location Information message, and the provide location information message is an SLPP Provide Location Information message.

Clause 27. The method of any of clauses 14 to 26, wherein the first group identifier is a Managed Groupcast Group Identifier.

Clause 28. The method of any of clauses 14 to 27, wherein: the request capabilities message is an SLPP Request Capabilities message, and the sidelink positioning capabilities message is a SLPP Provide Capabilities message.

Clause 29. A user equipment (UE), comprising: one or more memories; one or more transceivers; and one or more processors communicatively coupled to the one or more memories and the one or more transceivers, the one or more processors, either alone or in combination, configured to: transmit, via the one or more transceivers, to a plurality of UEs, a request capabilities message for a sidelink positioning session among the plurality of UEs, wherein the request capabilities message includes a first group identifier for the UE and the plurality of UEs; receive, via the one or more transceivers, a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session; and transmit, via the one or more transceivers, to the plurality of UEs, based at least in part on the one or more capabilities of each of the plurality of UEs, a message indicating that one or more UEs of the plurality of UEs are not to participate in the sidelink positioning session.

Clause 30. The UE of clause 29, wherein the one or more processors, either alone or in combination, are further configured to: determine that the one or more capabilities of each of the one or more UEs are incompatible with performance of the sidelink positioning session.

Clause 31. The UE of any of clauses 29 to 30, wherein the message indicating that the one or more UEs are not to participate in the sidelink positioning session comprises the message including: identifiers of remaining UEs of the plurality of UEs other than the one or more UEs, or identifiers of the one or more UEs.

Clause 32. The UE of any of clauses 29 to 31, wherein the message further includes the first group identifier.

Clause 33. The UE of any of clauses 29 to 32, wherein the message further includes a second group identifier for the UE and remaining UEs of the plurality of UEs other than the one or more UEs.

Clause 34. The UE of any of clauses 29 to 33, wherein the message is: a provide assistance data message for the sidelink positioning session or a request location information message for the sidelink positioning session.

Clause 35. The UE of clause 34, wherein: the provide assistance data message is a sidelink positioning protocol (SLPP) Provide Assistance Data message, and the request location information message is an SLPP Request Location Information message.

Clause 36. The UE of any of clauses 29 to 35, wherein the message is a positioning session modification message.

Clause 37. The UE of clause 36, wherein the positioning session modification message is an SLPP message modifying the sidelink positioning session.

Clause 38. The UE of any of clauses 29 to 37, wherein the one or more processors, either alone or in combination, are further configured to: transmit, via the one or more transceivers, a request location information message to remaining UEs of the plurality of UEs other than the one or more UEs.

Clause 39. The UE of clause 38, wherein the request location information message is an SLPP Request Location Information message.

Clause 40. The UE of any of clauses 29 to 39, wherein the first group identifier is a Managed Groupcast Group Identifier.

Clause 41. The UE of any of clauses 29 to 40, wherein: the request capabilities message is an SLPP Request Capabilities message, and the plurality of sidelink positioning capabilities messages is a plurality of SLPP Provide Capabilities messages.

Clause 42. A first user equipment (UE), comprising: one or more memories; one or more transceivers; and one or more processors communicatively coupled to the one or more memories and the one or more transceivers, the one or more processors, either alone or in combination, configured to: receive, via the one or more transceivers, from a second UE, a request capabilities message for a sidelink positioning session among a plurality of UEs, including the first UE and the second UE, wherein the request capabilities message includes a first group identifier for the plurality of UEs; transmit, via the one or more transceivers, to the second UE, a sidelink positioning capabilities message including the first group identifier and one or more capabilities of the first UE to participate in the sidelink positioning session; and receive, via the one or more transceivers, from the second UE, a message indicating that one or more UEs of the plurality of UEs are not to participate in the sidelink positioning session.

Clause 43. The first UE of clause 42, wherein the message indicating that the one or more UEs are not to participate in the sidelink positioning session comprises the message including: identifiers of remaining UEs of the plurality of UEs other than the one or more UEs, or identifiers of the one or more UEs.

Clause 44. The first UE of any of clauses 42 to 43, wherein the message further includes the first group identifier.

Clause 45. The first UE of any of clauses 42 to 44, wherein the message further includes a second group identifier for the UE and remaining UEs of the plurality of UEs other than the one or more UEs.

Clause 46. The first UE of any of clauses 42 to 45, wherein the message is: a provide assistance data message for the sidelink positioning session, or a request location information message for the sidelink positioning session.

Clause 47. The first UE of clause 46, wherein: the provide assistance data message is a sidelink positioning protocol (SLPP) Provide Assistance Data message, and the request location information message is an SLPP Request Location Information message.

Clause 48. The first UE of any of clauses 42 to 47, wherein the message is a positioning session modification message.

Clause 49. The first UE of clause 48, wherein the positioning session modification message is an SLPP message modifying the sidelink positioning session.

Clause 50. The first UE of any of clauses 42 to 49, wherein the first UE is one of the one or more UEs.

Clause 51. The first UE of clause 50, wherein the one or more processors, either alone or in combination, are further configured to: receive, via the one or more transceivers, from the second UE, a request location information message; refrain from responding to the request location information message based on the first UE being one of the one or more UEs; and receive, via the one or more transceivers, from the second UE, a provide location information message, wherein the provide location information message does not include positioning results for the first UE.

Clause 52. The first UE of any of clauses 42 to 51, wherein the first UE is one of remaining UEs of the plurality of UEs other than the one or more UEs.

Clause 53. The first UE of clause 52, wherein the one or more processors, either alone or in combination, are further configured to: receive, via the one or more transceivers, from the second UE, a request location information message; and transmit, via the one or more transceivers, to the second UE, a provide location information message.

Clause 54. The first UE of clause 53, wherein: the request location information message is an SLPP Request Location Information message, and the provide location information message is an SLPP Provide Location Information message.

Clause 55. The first UE of any of clauses 42 to 54, wherein the first group identifier is a Managed Groupcast Group Identifier.

Clause 56. The first UE of any of clauses 42 to 55, wherein: the request capabilities message is an SLPP Request Capabilities message, and the sidelink positioning capabilities message is a SLPP Provide Capabilities message.

Clause 57. A user equipment (UE), comprising: means for transmitting, to a plurality of UEs, a request capabilities message for a sidelink positioning session among the plurality of UEs, wherein the request capabilities message includes a first group identifier for the UE and the plurality of UEs; means for receiving a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session; and means for transmitting, to the plurality of UEs, based at least in part on the one or more capabilities of each of the plurality of UEs, a message indicating that one or more UEs of the plurality of UEs are not to participate in the sidelink positioning session.

Clause 58. The UE of clause 57, further comprising: means for determining that the one or more capabilities of each of the one or more UEs are incompatible with performance of the sidelink positioning session.

Clause 59. The UE of any of clauses 57 to 58, wherein the message indicating that the one or more UEs are not to participate in the sidelink positioning session comprises the message including: identifiers of remaining UEs of the plurality of UEs other than the one or more UEs, or identifiers of the one or more UEs.

Clause 60. The UE of any of clauses 57 to 59, wherein the message further includes the first group identifier.

Clause 61. The UE of any of clauses 57 to 60, wherein the message further includes a second group identifier for the UE and remaining UEs of the plurality of UEs other than the one or more UEs.

Clause 62. The UE of any of clauses 57 to 61, wherein the message is: a provide assistance data message for the sidelink positioning session or a request location information message for the sidelink positioning session.

Clause 63. The UE of clause 62, wherein: the provide assistance data message is a sidelink positioning protocol (SLPP) Provide Assistance Data message, and the request location information message is an SLPP Request Location Information message.

Clause 64. The UE of any of clauses 57 to 63, wherein the message is a positioning session modification message.

Clause 65. The UE of clause 64, wherein the positioning session modification message is an SLPP message modifying the sidelink positioning session.

Clause 66. The UE of any of clauses 57 to 65, further comprising: means for transmitting a request location information message to remaining UEs of the plurality of UEs other than the one or more UEs.

Clause 67. The UE of clause 66, wherein the request location information message is an SLPP Request Location Information message.

Clause 68. The UE of any of clauses 57 to 67, wherein the first group identifier is a Managed Groupcast Group Identifier.

Clause 69. The UE of any of clauses 57 to 68, wherein: the request capabilities message is an SLPP Request Capabilities message, and the plurality of sidelink positioning capabilities messages is a plurality of SLPP Provide Capabilities messages.

Clause 70. A first user equipment (UE), comprising: means for receiving, from a second UE, a request capabilities message for a sidelink positioning session among a plurality of UEs, including the first UE and the second UE, wherein the request capabilities message includes a first group identifier for the plurality of UEs; means for transmitting, to the second UE, a sidelink positioning capabilities message including the first group identifier and one or more capabilities of the first UE to participate in the sidelink positioning session; and means for receiving, from the second UE, a message indicating that one or more UEs of the plurality of UEs are not to participate in the sidelink positioning session.

Clause 71. The first UE of clause 70, wherein the message indicating that the one or more UEs are not to participate in the sidelink positioning session comprises the message including: identifiers of remaining UEs of the plurality of UEs other than the one or more UEs, or identifiers of the one or more UEs.

Clause 72. The first UE of any of clauses 70 to 71, wherein the message further includes the first group identifier.

Clause 73. The first UE of any of clauses 70 to 72, wherein the message further includes a second group identifier for the UE and remaining UEs of the plurality of UEs other than the one or more UEs.

Clause 74. The first UE of any of clauses 70 to 73, wherein the message is: a provide assistance data message for the sidelink positioning session, or a request location information message for the sidelink positioning session.

Clause 75. The first UE of clause 74, wherein: the provide assistance data message is a sidelink positioning protocol (SLPP) Provide Assistance Data message, and the request location information message is an SLPP Request Location Information message.

Clause 76. The first UE of any of clauses 70 to 75, wherein the message is a positioning session modification message.

Clause 77. The first UE of clause 76, wherein the positioning session modification message is an SLPP message modifying the sidelink positioning session.

Clause 78. The first UE of any of clauses 70 to 77, wherein the first UE is one of the one or more UEs.

Clause 79. The first UE of clause 78, further comprising: means for receiving, from the second UE, a request location information message; means for refraining from responding to the request location information message based on the first UE being one of the one or more UEs; and means for receiving, from the second UE, a provide location information message, wherein the provide location information message does not include positioning results for the first UE.

Clause 80. The first UE of any of clauses 70 to 79, wherein the first UE is one of remaining UEs of the plurality of UEs other than the one or more UEs.

Clause 81. The first UE of clause 80, further comprising: means for receiving, from the second UE, a request location information message; and means for transmitting, to the second UE, a provide location information message.

Clause 82. The first UE of clause 81, wherein: the request location information message is an SLPP Request Location Information message, and the provide location information message is an SLPP Provide Location Information message.

Clause 83. The first UE of any of clauses 70 to 82, wherein the first group identifier is a Managed Groupcast Group Identifier.

Clause 84. The first UE of any of clauses 70 to 83, wherein: the request capabilities message is an SLPP Request Capabilities message, and the sidelink positioning capabilities message is a SLPP Provide Capabilities message.

Clause 85. A non-transitory computer-readable medium storing computer-executable instructions that, when executed by a user equipment (UE), cause the UE to: transmit, to a plurality of UEs, a request capabilities message for a sidelink positioning session among the plurality of UEs, wherein the request capabilities message includes a first group identifier for the UE and the plurality of UEs; receive a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session; and transmit, to the plurality of UEs, based at least in part on the one or more capabilities of each of the plurality of UEs, a message indicating that one or more UEs of the plurality of UEs are not to participate in the sidelink positioning session.

Clause 86. The non-transitory computer-readable medium of clause 85, further comprising computer-executable instructions that, when executed by the UE, cause the UE to: determine that the one or more capabilities of each of the one or more UEs are incompatible with performance of the sidelink positioning session.

Clause 87. The non-transitory computer-readable medium of any of clauses 85 to 86, wherein the message indicating that the one or more UEs are not to participate in the sidelink positioning session comprises the message including: identifiers of remaining UEs of the plurality of UEs other than the one or more UEs, or identifiers of the one or more UEs.

Clause 88. The non-transitory computer-readable medium of any of clauses 85 to 87, wherein the message further includes the first group identifier.

Clause 89. The non-transitory computer-readable medium of any of clauses 85 to 88, wherein the message further includes a second group identifier for the UE and remaining UEs of the plurality of UEs other than the one or more UEs.

Clause 90. The non-transitory computer-readable medium of any of clauses 85 to 89, wherein the message is: a provide assistance data message for the sidelink positioning session or a request location information message for the sidelink positioning session.

Clause 91. The non-transitory computer-readable medium of clause 90, wherein: the provide assistance data message is a sidelink positioning protocol (SLPP) Provide Assistance Data message, and the request location information message is an SLPP Request Location Information message.

Clause 92. The non-transitory computer-readable medium of any of clauses 85 to 91, wherein the message is a positioning session modification message.

Clause 93. The non-transitory computer-readable medium of clause 92, wherein the positioning session modification message is an SLPP message modifying the sidelink positioning session.

Clause 94. The non-transitory computer-readable medium of any of clauses 85 to 93, further comprising computer-executable instructions that, when executed by the UE, cause the UE to: transmit a request location information message to remaining UEs of the plurality of UEs other than the one or more UEs.

Clause 95. The non-transitory computer-readable medium of clause 94, wherein the request location information message is an SLPP Request Location Information message.

Clause 96. The non-transitory computer-readable medium of any of clauses 85 to 95, wherein the first group identifier is a Managed Groupcast Group Identifier.

Clause 97. The non-transitory computer-readable medium of any of clauses 85 to 96, wherein: the request capabilities message is an SLPP Request Capabilities message, and the plurality of sidelink positioning capabilities messages is a plurality of SLPP Provide Capabilities messages.

Clause 98. A non-transitory computer-readable medium storing computer-executable instructions that, when executed by a first user equipment (UE), cause the first UE to: receive, from a second UE, a request capabilities message for a sidelink positioning session among a plurality of UEs, including the first UE and the second UE, wherein the request capabilities message includes a first group identifier for the plurality of UEs; transmit, to the second UE, a sidelink positioning capabilities message including the first group identifier and one or more capabilities of the first UE to participate in the sidelink positioning session; and receive, from the second UE, a message indicating that one or more UEs of the plurality of UEs are not to participate in the sidelink positioning session.

Clause 99. The non-transitory computer-readable medium of clause 98, wherein the message indicating that the one or more UEs are not to participate in the sidelink positioning session comprises the message including: identifiers of remaining UEs of the plurality of UEs other than the one or more UEs, or identifiers of the one or more UEs.

Clause 100. The non-transitory computer-readable medium of any of clauses 98 to 99, wherein the message further includes the first group identifier.

Clause 101. The non-transitory computer-readable medium of any of clauses 98 to 100, wherein the message further includes a second group identifier for the UE and remaining UEs of the plurality of UEs other than the one or more UEs.

Clause 102. The non-transitory computer-readable medium of any of clauses 98 to 101, wherein the message is: a provide assistance data message for the sidelink positioning session, or a request location information message for the sidelink positioning session.

Clause 103. The non-transitory computer-readable medium of clause 102, wherein: the provide assistance data message is a sidelink positioning protocol (SLPP) Provide Assistance Data message, and the request location information message is an SLPP Request Location Information message.

Clause 104. The non-transitory computer-readable medium of any of clauses 98 to 103, wherein the message is a positioning session modification message.

Clause 105. The non-transitory computer-readable medium of clause 104, wherein the positioning session modification message is an SLPP message modifying the sidelink positioning session.

Clause 106. The non-transitory computer-readable medium of any of clauses 98 to 105, wherein the first UE is one of the one or more UEs.

Clause 107. The non-transitory computer-readable medium of clause 106, further comprising computer-executable instructions that, when executed by the first UE, cause the first UE to: receive, from the second UE, a request location information message; refrain from responding to the request location information message based on the first UE being one of the one or more UEs; and receive, from the second UE, a provide location information message, wherein the provide location information message does not include positioning results for the first UE.

Clause 108. The non-transitory computer-readable medium of any of clauses 98 to 107, wherein the first UE is one of remaining UEs of the plurality of UEs other than the one or more UEs.

Clause 109. The non-transitory computer-readable medium of clause 108, further comprising computer-executable instructions that, when executed by the first UE, cause the first UE to: receive, from the second UE, a request location information message; and transmit, to the second UE, a provide location information message.

Clause 110. The non-transitory computer-readable medium of clause 109, wherein: the request location information message is an SLPP Request Location Information message, and the provide location information message is an SLPP Provide Location Information message.

Clause 111. The non-transitory computer-readable medium of any of clauses 98 to 110, wherein the first group identifier is a Managed Groupcast Group Identifier.

Clause 112. The non-transitory computer-readable medium of any of clauses 98 to 111, wherein: the request capabilities message is an SLPP Request Capabilities message, and the sidelink positioning capabilities message is a SLPP Provide Capabilities message.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC.

The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. For example, the functions, steps and/or actions of the method claims in accordance with the aspects of the disclosure described herein need not be performed in any particular order. Further, no component, function, action, or instruction described or claimed herein should be construed as critical or essential unless explicitly described as such. Furthermore, as used herein, the terms "set," "group," and the like are intended to include one or more of the stated elements. Also, as used herein, the terms "has," "have," "having," "comprises," "comprising," "includes," "including," and the like does not preclude the presence of one or more additional elements (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of") or the alternatives are mutually exclusive (e.g., "one or more" should not be interpreted as "one and more"). Furthermore, although components, functions, actions, and instructions may be described or claimed in the singular, the plural is contemplated unless limitation to the singular is explicitly stated. Accordingly, as used herein, the articles "a," "an," "the," and "said" are intended to include one or more of the stated elements. Additionally, as used herein, the terms "at least one" and "one or more" encompass "one" component, function, action, or instruction performing or capable of performing a described or claimed functionality and also "two or more" components, functions, actions, or instructions performing or capable of performing a described or claimed functionality in combination.

What is claimed is:

1. A user equipment (UE), comprising:
one or more memories;
one or more transceivers;
one or more processors communicatively coupled to the one or more memories and the one or more transceivers, the one or more processors, either alone or in combination, configured to:
transmit, via the one or more transceivers, to a plurality of UEs, a request capabilities message for a sidelink positioning session among the plurality of Ushering the request capabilities message includes a first group identifier for the UE and the plurality of UEs;
receive, via the one or more transceivers, a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session; and
transmit, via the one or more transceivers, to the plurality of UEs, based at least in part on the one or more capabilities of each of the plurality of UEs, a message indicating that one or more UEs of the plurality of UEs are not to participate in the sidelink positioning session;
wherein the message indicating that the one or more UEs are not to participate in the sidelink positioning session comprises the message including:
identifiers of remaining UEs of the plurality of UEs other than the one or more UEs, or
identifiers of the one or more UEs.

2. The UE of claim 1, wherein the one or more processors, either alone or in combination, are further configured to:
determine that the one or more capabilities of each of the one or more UEs are incompatible with performance of the sidelink positioning session.

3. The UE of claim 1, wherein the message further includes the first group identifier.

4. The UE of claim 1, wherein the message further includes a second group identifier for the UE and remaining UEs of the plurality of UEs other than the one or more UEs.

5. The UE of claim 1, wherein the message is:
a provide assistance data message for the sidelink positioning session or
a request location information message for the sidelink positioning session.

6. The UE of claim 5, wherein: the provide assistance data message is a sidelink positioning protocol (SLPP) Provide Assistance Data message, and
the request location information message is an SLPP Request Location Information message.

7. The UE of claim 1, wherein the message is a positioning session modification message.

8. The UE of claim 7, wherein the positioning session modification message is an SLPP message modifying the sidelink positioning session.

9. The UE of claim 1, wherein the one or more processors, either alone or in combination, are further configured to:
transmit, via the one or more transceivers, a request location information message to remaining UEs of the plurality of UEs other than the one or more UEs.

10. The UE of claim 9, wherein the request location information message is an SLPP Request Location Information message.

11. The UE of claim 1, wherein the first group identifier is a Managed Groupcast Group Identifier.

12. The UE of claim 1, wherein:

the request capabilities message is an SLPP Request Capabilities message, and the plurality of sidelink positioning capabilities messages is a plurality of SLPP Provide Capabilities messages.

13. A first user equipment (UE), comprising:

one or more memories;

one or more transceivers;

one or more processors communicatively coupled to the one or more memories and the one or more transceivers, the one or more processors, either alone or in combination, configured to:

receive, via the one or more transceivers, from a second UE, a request capabilities message for a sidelink positioning session among a plurality of UEs, including the first UE and the second UE, wherein the request capabilities message includes a first group identifier for the plurality of UEs;

transmit, via the one or more transceivers, to the second UE, a sidelink positioning capabilities message including the first group identifier and one or more capabilities of the first UE to participate in the sidelink positioning session; and receive, via the one or more transceivers, from the second UE, a message indicating that one or more UEs of the plurality of UEs are not to participate in the sidelink positioning session;

wherein the message indicating that the one or more UEs are not to participate in the sidelink positioning session comprises the message including:

identifiers of remaining UEs of the plurality of UEs other than the one or more UEs, or identifiers of the one or more UEs.

14. The first UE of claim 13, wherein the message further includes the first group identifier.

15. The first UE of claim 13, wherein the message further includes a second group identifier for the UE and remaining UEs of the plurality of UEs other than the one or more UEs.

16. The first UE of claim 13, wherein the message is:

a provide assistance data message for the sidelink positioning session, or a request location information message for the sidelink positioning session.

17. The first UE of claim 16, wherein:

the provide assistance data message is a sidelink positioning protocol (SLPP) Provide Assistance Data message, and the request location information message is an SLPP Request Location Information message.

18. The first UE of claim 13, wherein the message is a positioning session modification message.

19. The first UE of claim 18, wherein the positioning session modification message is an SLPP message modifying the sidelink positioning session.

20. The first UE of claim 13, wherein the first UE is one of the one or more UEs.

21. The first UE of claim 20, wherein the one or more processors, either alone or in combination, are further configured to:

receive, via the one or more transceivers, from the second UE, a request location information message;

refrain from responding to the request location information message based on the first UE being one of the one or more UEs; and receive, via the one or more transceivers, from the second UE, a provide location information message, wherein the provide location information message does not include positioning results for the first UE.

22. The first UE of claim 13, wherein the first UE is one of remaining UEs of the plurality of UEs other than the one or more UEs.

23. The first UE of claim 22, wherein the one or more processors, either alone or in combination, are further configured to:

receive, via the one or more transceivers, from the second UE, a request location information message; and transmit, via the one or more transceivers, to the second UE, a provide location information message.

24. The first UE of claim 23, wherein: the request location information message is an SLPP Request Location Information message, and the provide location information message is an SLPP Provide Location Information message.

25. The first UE of claim 13, wherein the first group identifier is a Managed Groupcast Group Identifier.

26. The first UE of claim 13, wherein:

the request capabilities message is an SLPP Request Capabilities message, and the sidelink positioning capabilities message is a SLPP Provide Capabilities message.

27. A method of wireless communication performed by a user equipment (UE), comprising:

transmitting, to a plurality of UEs, a request capabilities message for a sidelink positioning session among the plurality of UEs, wherein the request capabilities message includes a first group identifier for the UE and the plurality of UEs;

receiving a plurality of sidelink positioning capabilities messages from the plurality of UEs, wherein each of the plurality of sidelink positioning capabilities messages includes the first group identifier and one or more capabilities of a corresponding UE of the plurality of UEs to participate in the sidelink positioning session; and transmitting, to the plurality of UEs, based at least in part on the one or more capabilities of each of the plurality of UEs, a message indicating that one or more UEs of the plurality of UEs are not to participate in the sidelink positioning session;

wherein the message indicating that the one or more UEs are not to participate in the sidelink positioning session comprises the message including:

identifiers of remaining UEs of the plurality of UEs other than the one or more UEs, or identifiers of the one or more UEs.

28. A method of wireless communication performed by a first user equipment (UE), comprising:

receiving, from a second UE, a request capabilities message for a sidelink positioning session among a plurality of UEs, including the first UE and the second UE, wherein the request capabilities message includes a first group identifier for the plurality of UEs;

transmitting, to the second UE, a sidelink positioning capabilities message including the first group identifier and one or more capabilities of the first UE to participate in the sidelink positioning session; and receiving, from the second UE, a message indicating that one or more UEs of the plurality of UEs are not to participate in the sidelink positioning session;

wherein the message indicating that the one or more UEs are not to participate in the sidelink positioning session comprises the message including:

identifiers of remaining UEs of the plurality of UEs other than the one or more UEs, or identifiers of the one or more UEs.

* * * * *